United States Patent [19]

Ohashi

[11] Patent Number: 5,018,030
[45] Date of Patent: May 21, 1991

[54] CASSETTE LOADING MECHANISM OF A MAGNETIC RECORDING AND REPRODUCING APPARATUS

[75] Inventor: Keiichi Ohashi, Tochigi, Japan

[73] Assignee: Sharp Kabushiki Kaisha, Osaka, Japan

[21] Appl. No.: 479,464

[22] Filed: Feb. 13, 1990

[30] Foreign Application Priority Data

Feb. 18, 1989 [JP] Japan ................................. 1-39029
Apr. 3, 1989 [JP] Japan ................................. 1-85094

[51] Int. Cl.⁵ ..................... G11B 15/60; G11B 15/665
[52] U.S. Cl. ........................................ 360/94; 360/85
[58] Field of Search ................. 360/94, 85, 96.5, 96.6

[56] References Cited

U.S. PATENT DOCUMENTS 4,631,607 12/1986 Katsumata ........................ 360/96.5
4,786,996 11/1988 Ohtani et al. ....................... 360/94
4,866,550 9/1989 Ohashi et al. ....................... 360/94
4,873,593 10/1989 Baranski ............................ 360/96.5
4,897,744 1/1990 Tanaka et al. ....................... 360/94

FOREIGN PATENT DOCUMENTS 0286751 10/1988 European Pat. Off. .
0335271 10/1989 European Pat. Off. .
64-42051 2/1989 Japan .

Primary Examiner—John H. Wolff

[57] ABSTRACT

A cassette loading mechanism of a magnetic recording and reproducing apparatus is capable of selectively loading a large-sized cassette and a small-sized cassette. A large-sized cassette insertion opening having a form corresponding to the large-sized cassette (3) is provided in a cassette control unit (K1). The inserted large-sized cassette (3) is supported by a slider (6). This slider (6) is movable between an insertion position (6S) and an operation position (6P). The small-sized cassette (1) is received in a housing (19) outside the cassette control unit (K1) through the large-sized cassette insertion opening and it is set and supported in an adapter chassis (14). The adapter chassis (14) is movable through a slide plate (30) between a retreat position (14S) enabling insertion of the large-sized cassette (3) and a setting position (14G), and between the setting position (14G) and an operation position (14D). The adapter chassis (14) can be attached to the slider (6) in the operation position (6P).

12 Claims, 23 Drawing Sheets

CASSETTE INSERTING DIRECTION

CASSETTE LOADING MECHANISM OF A MAGNETIC RECORDING AND REPRODUCING APPARATUS

BACKGROUND OF THE INVENTION

1. Field of the Invention

The present invention relates to a cassette loading mechanism of a magnetic recording and reproducing apparatus and particularly to a cassette loading mechanism of a magnetic recording and reproducing apparatus in which a plurality of types of cassettes with different sizes containing a magnetic tape as a magnetic recording medium can be selectively loaded for recording and reproduction.

2. Description of the Background Art

There are plural types of cassettes of different sizes containing magnetic tapes as magnetic recording media. In order to load various cassettes of different sizes for recording and reproduction, magnetic recording and reproducing apparatus such as video tape recorders (VTR's) corresponding to the respective sizes of the cassettes are used. If recording or reproduction is to be carried out on a small-sized cassette by using a large-sized cassette VTR, a cassette adapter is used to load the small-sized cassette in a recording or reproduction position for the large-sized cassette.

The inventors of the present application disclosed an invention of a cassette loading mechanism capable of selectively loading plural types of cassettes of different sizes to carry out recording and reproduction, in Japanese Patent Application No. 62-198415 filed on Aug. 7, 1987 (Patent Laying-Open No. 64-42051) and U.S. Pat. application Ser. No. 171,746 with claim to priority on the basis of the above mentioned Japanese Patent Application. According to the cassette loading mechanism proposed in the above mentioned invention, a large-sized cassette and a small-sized cassette can be selectively loaded for recording and reproduction without using a cassette adapter.

FIGS. 1 and 2 are left side views of a cassette control unit of a VTR of the above mentioned background art (taken from the direction of insertion of a cassette). In principle, the right side views are mechanically identical to those views.

Referring to FIGS. 1 and 2, a guide plate 7 is provided with two L-shaped grooves 7a, 7b and two straight grooves 7c, 7d. This guide plate 7 is fixed to a main chassis 12 of the VTR by means of two fixation screws 13. A drive gear 8 and a drive arm 9 are fixed to the guide plate 7, rotatably around the same shaft. A loading gear 10 and a loading arm 11 are fixed to the guide plate 7, rotatably around the same shaft.

A slider 6 is provided with a first guide shaft 6a and a second guide shaft 6b on each of its two sides. The first and second guide shafts 6a and 6b are inserted in the L-shaped grooves 7a and 7b, respectively, of the guide plate 7. The second guide shaft 6b is also inserted in a U-shaped groove 9a of the drive arm 9.

An adapter chassis 14 is provided with four adapter guide shafts 14a on each of its two sides. Respective two adapter guide shafts 14a are inserted in each of the straight grooves 7c and 7d of the guide plate 7. Further, a loading shaft 14b is provided on the adapter chassis 14. The loading shaft 14b is provided rotatably in the loading arm 11.

Though not shown, the right and left driver gears 8 have phase gears to be rotated with the same phase. The right and left loading gears 10 are also provided with phase gears to be rotated with the same phase. A cassette cover 15 for small-sized cassette is attached to the guide plate 7 rotatably around a cover support shaft 7e. The cassette cover 15 is actuated toward a closing direction by a return spring 16.

FIGS. 3 and 4 are schematic views showing the components of the adapter chassis 14 as the insertion portion for a small-sized cassette 1. The adapter chassis 14 has a first housing arm 17 rotatable around a shaft 17a at an intersection therebetween. An end of a second housing arm 18 is attached slidably to an elongate hole 14c of the adapter chassis 14. The first housing arm 17 and the second housing arm 18 are engaged with each other rotatably at their central portions. The first and second housing arms 17 and 18 are further attached rotatably to a housing 19. An up spring 20 is attached to the first and second housing arms 17 and 18. This enables the housing 19 to be raised.

Referring to FIG. 1, in the case of loading a large-sized cassette 3 into the VTR, when the large-sized cassette 3 is manually inserted into a slider (as shown in FIG. 5), the cassette 3 is pressed fixedly against the slider 6 by means of a cassette spring 4 attached to the slider 6. A loading start switch (not shown) detects the large-sized cassette 3, thereby driving a drive motor (not shown). Thus, the drive gear 8 and the drive arm 9 are rotated in the direction shown by the arrow A. By this rotation, the second guide shaft 6b is driven. The slider 6 is guided along the two L-shaped grooves 7a and 7b of each guide plate 7 and moves horizontally. After that, the slider 6 lowers vertically to a position shown by 6P. Thus, the loading of the large-sized cassette 3 into the VTR is completed.

In the case of ejecting the large-sized cassette 3, the motor (not shown) is rotated reversely and the operation opposite to the above described operation is carried out, whereby the large-sized cassette 3 is taken out.

Referring to FIGS. 1 and 2, in the case of the small-sized cassette 1 into the VTR, when the small-sized cassette 1 is manually inserted into the housing 19, the cassette 1 is fixed in the housing 19 under pressure of a cassette spring 21 attached to the housing 19. The position of the housing 19 on this occasion is shown in FIG. 1. When the housing 19 is pushed downward, the housing 19 is moved to a position shown in FIG. 2. Then, by means of a lock mechanism (not shown) of the adapter chassis 14, the housing 19 is fitted and locked in the adapter chassis 14. Then, an insertion detection switch and a lock detection switch (both not shown) for the small-sized cassette 1 detect the locked state of the housing 19 where the small-sized cassette 1 is inserted. A housing motor (not shown) drives a first tape drawing-out arm 22 and a second tape drawing-out arm 23. As a result, a magnetic tape 1a is drawn out to a prescribed position 1d (as shown in FIG. 4). The first and second tape drawing-out arms 22 and 23 have their respective top ends provided with rotatable rollers and those arms are attached rotatably to the adapter chassis 14. At the same time as the above mentioned drive, the drive motor (not shown) is driven. As a result, in the same manner as in the case of loading the large-sized cassette 3, the slider 6 moves to the position 6P for recording and reproduction. After detection of the magnetic tape 1a drawn out to the prescribed position 1d and the slider 6 moved to the position 6P for recording and reproduction, a loading motor (not shown) is driven. Thus, the loading gears 10 and the loading arms 11 are rotated in the direction shown by the arrow B. Accordingly, the entire body of the adapter chassis 14 is guided by means of the adapter guide shaft 14a and the two straight grooves 7c, 7d of each guide plate 7, so that it is lowered while it is maintained horizontal. As a result, the entire body of the adapter chassis 14 is loaded on the slider 6 which has been moved to the position 6P for recording and reproduction. The adapter chassis 14 is moved to a position shown by 14Q. As shown in FIG. 5, any top plate is not provided on the slider 6. On the other hand, as shown in FIGS. 3 and 4, the adapter chassis 14 has slider escape holes 14d so that the first and second guide shafts 6a and 6b of the slider 6 may not interfere with the cassette spring 4. As a result, the adapter chassis 14 contacts four positioning shafts 12a, 12b, 12c and 12d without any gap.

As shown in FIG. 4, the small-sized cassette 1 is provided with a feed reel 1b and a rewind reel 1c. The magnetic tape 1a is wound on the feed reel 1b and the rewind reel 1c. The rewind reel 1c has a hub portion provided with a gear. A drive gear 2c attached rotatably to the adapter chassis 14 engages with the rewind reel 1c. The drive gear 2c engages with a drive reel 2d. The magnetic tape 1a is wound and rewound by driving the drive reel 2d and the feed reel 1b by means of a reel motor (not shown).

In order to eject the small-sized cassette 1, the loading motor (not shown) is rotated reversely and the adapter chassis 14 is raised by the operation opposite to the loading operation. When the raised adapter chassis 14 is detected, the drive motor (not shown) is rotated reversely and the slider 6 moves to the initial position by the same operation as in the case of ejecting the large-sized cassette 3. When the adapter chassis 14 is raised, the first and second drawing-out arms 22 and 23 are driven in the direction opposite to the above described direction, whereby the magnetic tape 1a returns to the initial position. The locking of the lock mechanism (not shown) of the housing 19 is cancelled by means of a solenoid (not shown). As a result, the housing 19 is raised by means of the up spring 20 to open the cassette cover 19 for the small-sized cassette. Thus, the small-sized cassette 1 is ready to be taken out.

While the small-sized cassette 1 is not inserted in the housing 19, the switch for detecting the insertion of the small-sized cassette 1 is not operated even if the housing 19 is depressed to be locked in the adapter chassis 14. In consequence, the first and second tape drawing-out arms 22, 23 are not driven, and the adapter chassis 14 is not lowered. Thus, when the small-sized cassette 1 is not used, the housing 19 is depressed and locked in the adapter chassis 14, whereby the cassette cover 15 can be closed. At this time, since the adapter chassis 14 is not lowered, the large-sized cassette 3 can be inserted.

FIG. 6 schematically shows such a cassette control unit of a magnetic recording and reproducing apparatus in which plural types of cassette of different sizes can be selectively loaded for recording and reproduction without using a cassette adapter. Referring to FIG. 6, when the large-sized cassette 3 is inserted from a front cabinet 34 in the direction shown by the arrow I, it is loaded in the direction shown by the arrow II, whereby it is set in a prescribed position. In order to load the small-sized cassette 1, the small-sized cassette 1 is inserted from an upper cabinet 24 in the direction shown by the arrow III and it is depressed in the direction shown by the arrow IV, whereby it is set in the adapter chassis 14.

Then, after the magnetic tape 1a is drawn out in the direction shown by the arrow V, the small-sized cassette 1 is lowered in the vertical direction shown by the arrow VI, whereby it is set in a prescribed position.

In the above described cassette loading mechanism, the inlet opening of the large-sized cassette exists on the front surface of the magnetic recording and reproducing apparatus. The inlet opening of the small-sized cassette exists on the upper surface of the magnetic recording and reproducing apparatus. Since the inlet openings of the large-sized cassette and the small-sized cassette are located in the different positions, the loading operation for the cassettes is not simple. Particularly, in the case where the magnetic recording and reproducing apparatus is used in a fixed manner in a rack or the like, it is sometimes difficult to insert and take out the small-sized cassette since the small-sized cassette inlet opening exists on the upper surface of the magnetic recording and reproducing apparatus. In addition, a large limitation is imposed on the design of the magnetic recording and reproducing apparatus because of the small-sized cassette inlet opening located on its upper surface. Further, since it is necessary to manually open or close the housing 19 at the time of loading or removing the small-sized cassette without association of movement of the adapter chassis 14 or the like, operability in loading or removing the small-sized cassette is not good.

SUMMARY OF THE INVENTION

The present invention has been accomplished to solve the above described problems and it is an object of the present invention to provide a cassette loading mechanism of a magnetic recording and reproducing apparatus, in which a small-sized cassette and a large-sized cassette can be inserted and taken out easily.

A cassette loading mechanism of a magnetic recording and reproducing apparatus according to an aspect of the present invention includes a case, large-sized cassette support means, large-sized cassette moving means, small-sized cassette support means, and small-sized cassette moving means. The case has a large-sized cassette inlet opening having a form corresponding to a large-sized cassette to be inserted. The large-sized cassette support means supports, in a prescribed position, the large-sized cassette inserted into the case through the large-sized cassette inlet opening. The large-sized cassette moving means moves the large-sized cassette support means between an inlet position and an operation position. The inlet position is a position where the large-sized cassette is inserted into and taken from the case through the large-sized cassette inlet opening. The operation position is a position where the large-sized cassette is magnetically recorded and reproduced. The small-sized cassette support means is disposed in the case and it sets and supports in a prescribed position a small-sized cassette received the outside of the case through the large-sized cassette inlet opening. The small-sized cassette moving means moves the small-sized cassette support means between a retreat position and a setting position, and between the setting position and an operation position. The retreat position is a position where the small-sized cassette is moved away from the moving course of the large-sized cassette when the large-sized cassette is inserted. The setting position is a position where the small-sized cassette is inserted and taken out outside the case through the large-sized cassette inlet opening. The operation position is a position where the small-sized cassette is magnetically recorded or reproduced. The small-sized cassette support means is constructed to be set in the large-sized cassette support means moved in the operation position.

According to this aspect of the invention, the small-sized cassette support means is provided to set and hold the small-sized cassette in the prescribed position outside the large-sized cassette inlet opening. Consequently, the small-sized cassette can be held outside the large-sized cassette inlet opening. Then, the small-sized cassette support means holding the small-sized cassette is taken into the case through the large-sized cassette inlet opening. The small-sized cassette support means is moved to the operation position by the small-sized cassette moving means. The small-sized cassette support means can be set in the large-sized cassette support means moved to the operation position for recording and reproduction. Accordingly, the small-sized cassette can be inserted through the large-sized cassette inlet opening and set in the operation position for recording and reproduction in the same manner as in the case of the large-sized cassette.

A cassette loading mechanism of a magnetic recording and reproducing apparatus according to another aspect of the present invention includes a case, small-sized cassette support means, entrance opening and closing means, guide means, drive means, actuating means, lock means, and lock cancel means. The case has a large-sized cassette insertion opening. The small-sized cassette support means is located inside the case and it sets and supports a small-sized cassette. The entrance opening and closing means is attached to the small-sized cassette support means and it opens and closes a small-sized cassette entrance The guide means guides the movement of the small-sized cassette support means between a retreat portion located away from the moving course of a large-sized cassette when it is inserted and a setting position where the small-sized cassette is set or taken out after projection of the small-sized cassette entrance outside the case through the large-sized cassette insertion opening, and between the setting position and the operation position where the small-sized cassette is subjected to magnetic recording and reproduction. The drive means moves the small-sized cassette support means by the guide means. The actuating means actuates the entrance opening and closing means to be in an open state. The lock means maintains the entrance opening and closing means in a closed state in opposition to the actuating force of the actuating means. The lock cancel means is provided to cancel the locking of the lock means when the small-sized cassette support means is moved to the setting position.

According to this aspect of the invention, the small-sized cassette support means is provided to set the small-sized cassette through the small-sized cassette entrance and to hold the small-sized cassette in the prescribed position outside the large-sized cassette insertion opening provided in the case. The small-sized cassette support means moves by the action of the guide means and the drive means to the retreat position outside the moving course of the large-sized cassette when it is inserted into the case. When the small-sized cassette is to be used for magnetic recording and reproduction, the small-sized cassette is set in the small-sized cassette entrance which is projected from the large-sized cassette insertion opening by the small-sized cassette support means, and the small-sized cassette support means moves to the operation position for magnetic recording and reproduction by the action of the guide means and the drive means. When the small-sized cassette support means is inside the case, the entrance opening and closing means is maintained in the closed state by the lock means. When the small-sized cassette entrance of the small-sized cassette support means is projected outside the case from the large-sized cassette insertion opening, the locked state of the lock means is cancelled by the lock cancel means and the actuating means opens the entrance opening and closing means so that the small-sized cassette can be inserted or taken out.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 14:
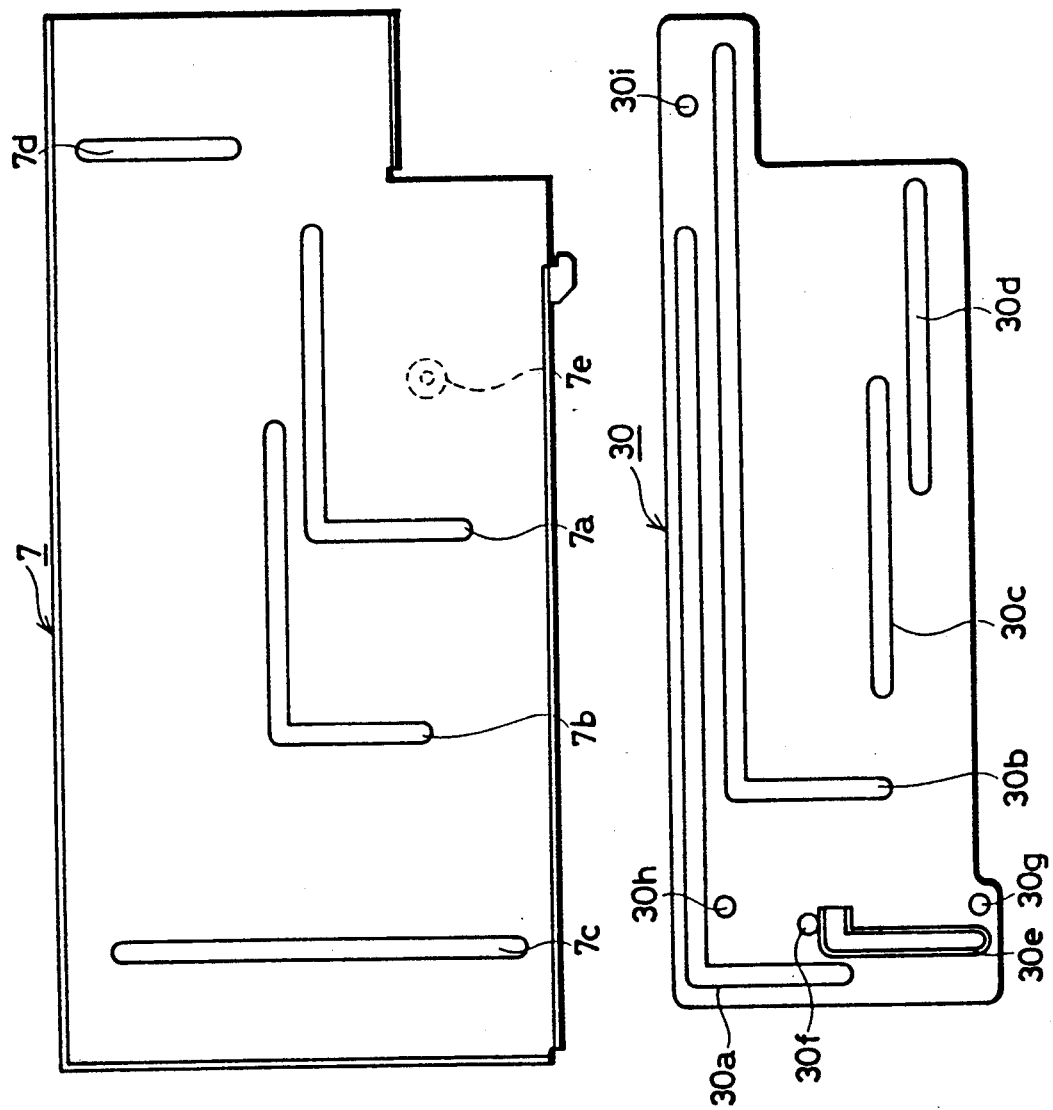
FIGS. 14A and 14B are left side views showing a guide plate and a slide plate used in the embodiment of the cassette control unit according to the present invention.
Figure 15:
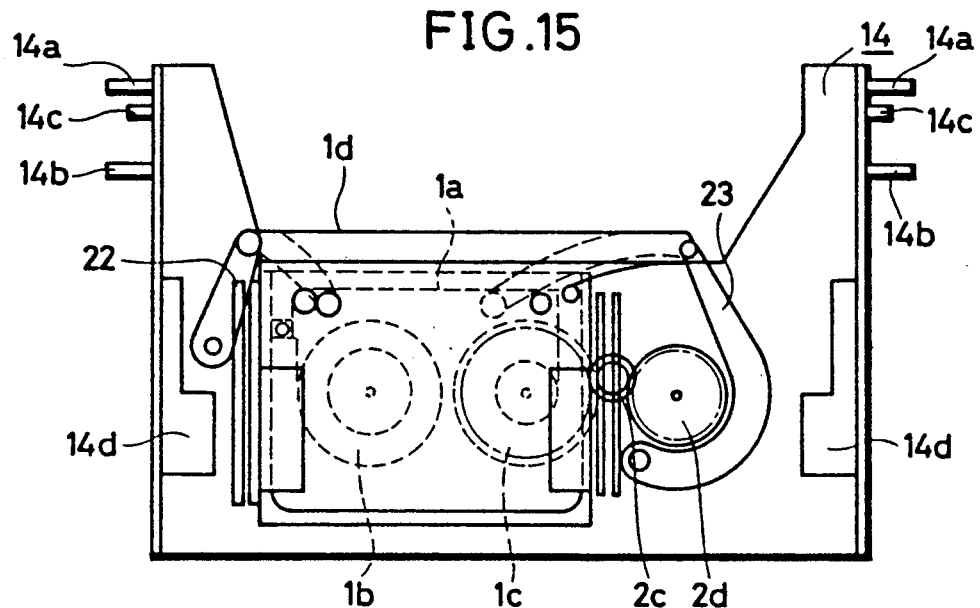
FIG. 15 is a plan view showing an example of an adapter chassis used for inserting a small-sized cassette.

FIGS. 7 to 17 show an embodiment of a magnetic recording and reproducing apparatus according to the present invention. FIGS. 7 to 13 are left side views of a cassette control unit K1 in the magnetic recording and reproducing apparatus according to the present invention. The right side views of this cassette control unit K1 are mechanically identical to those left side views. FIGS. 14A and 14B are side views showing a guide plate and a slide plate used in the cassette control unit K1 of the present invention. FIG. 15 is a plan view of an adapter chassis used for inserting a small-sized cassette.

Figure 7:
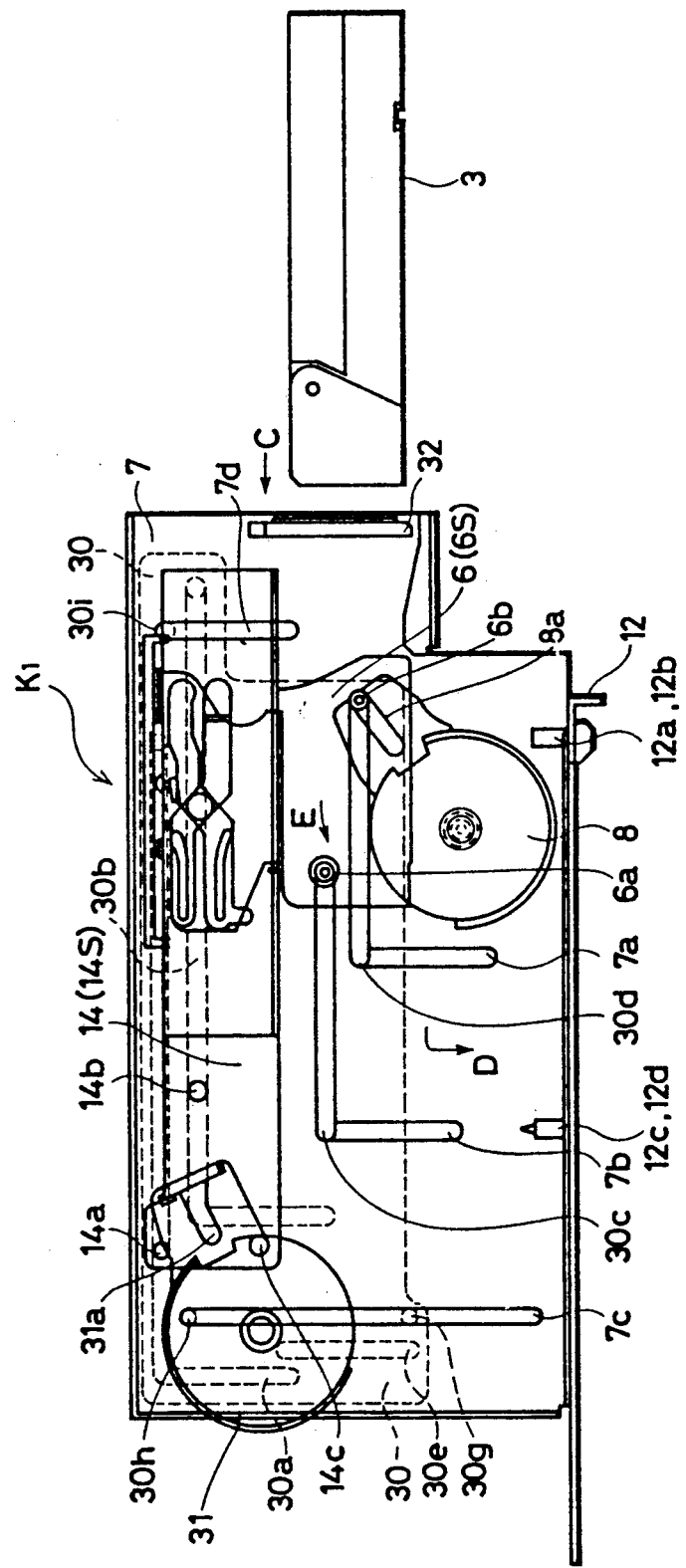
FIGS. 7, 8, 9, 10, 11, 12 and 13 are left side views of an embodiment of a cassette control unit of a magnetic recording and reproducing apparatus according to the present invention.
Figure 8:
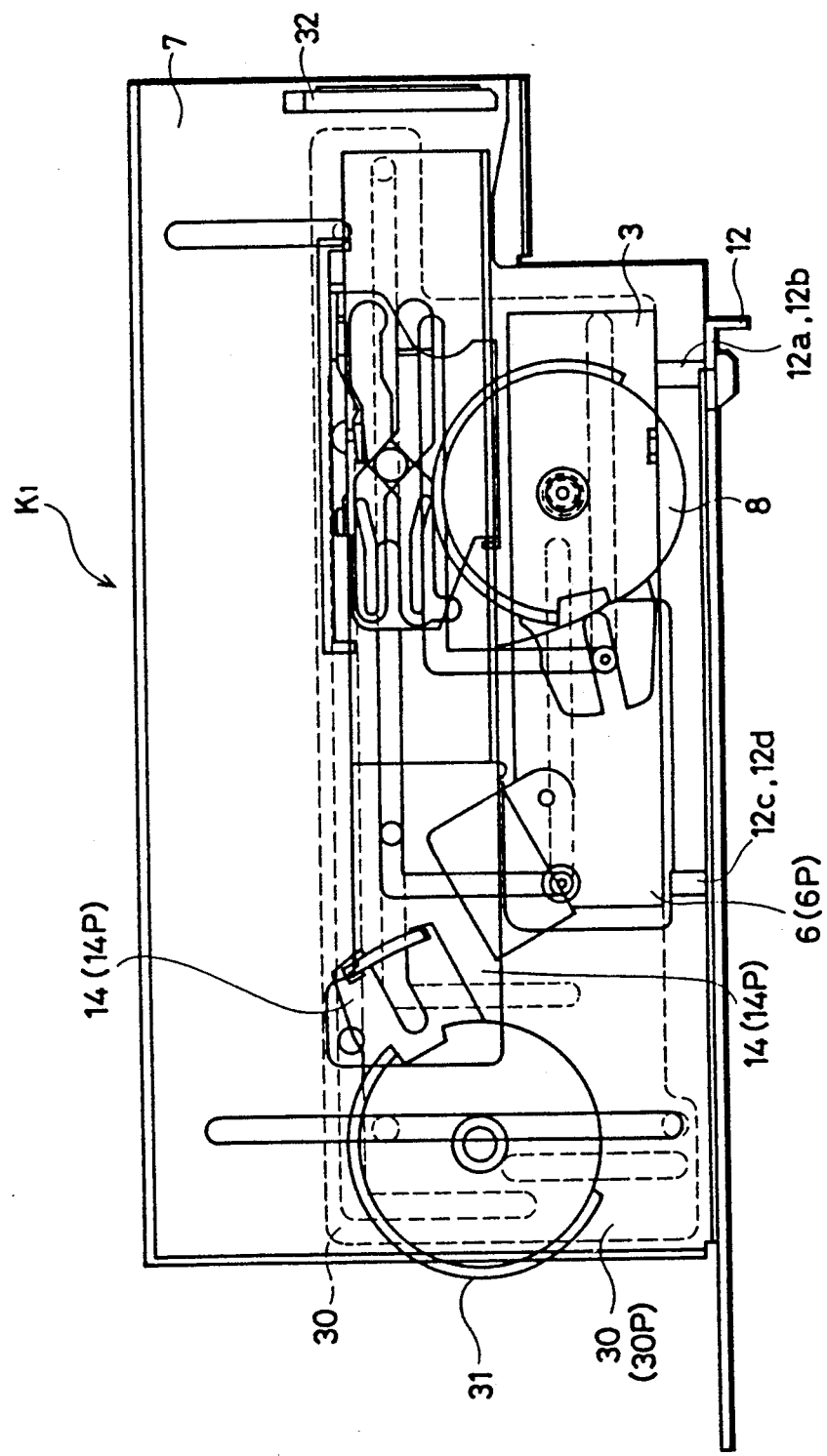
Figure 9:
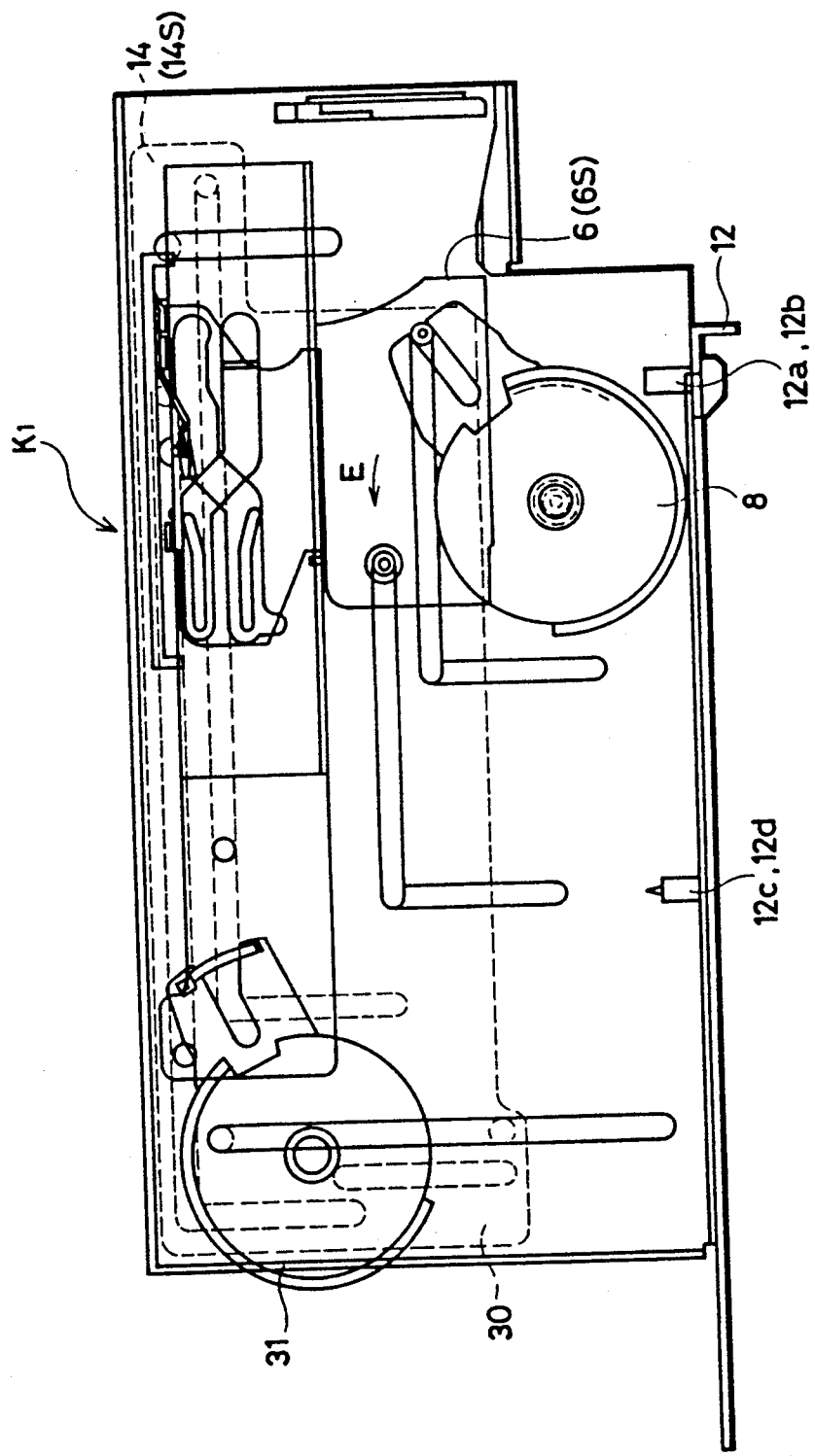
Figure 16:
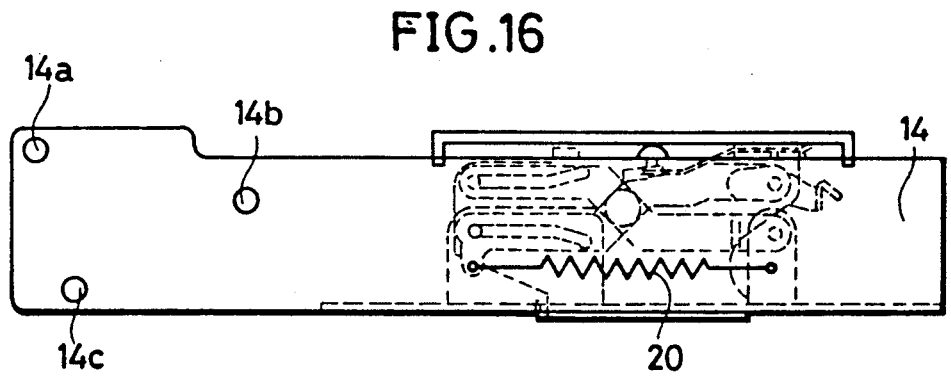
FIGS. 16 and 17 are left side views showing an adapter portion used for inserting a small-sized cassette.
Figure 17:
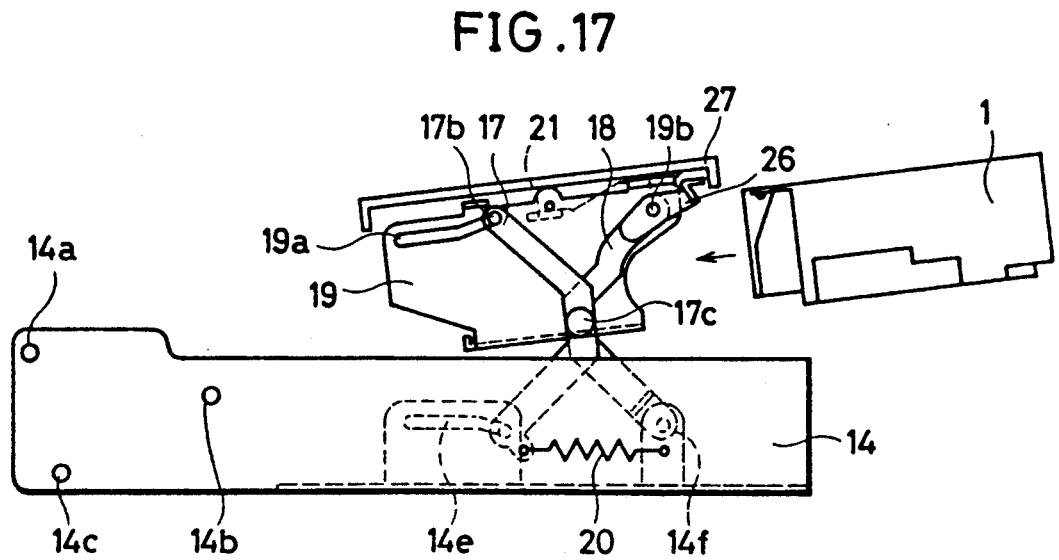
Figure 18:
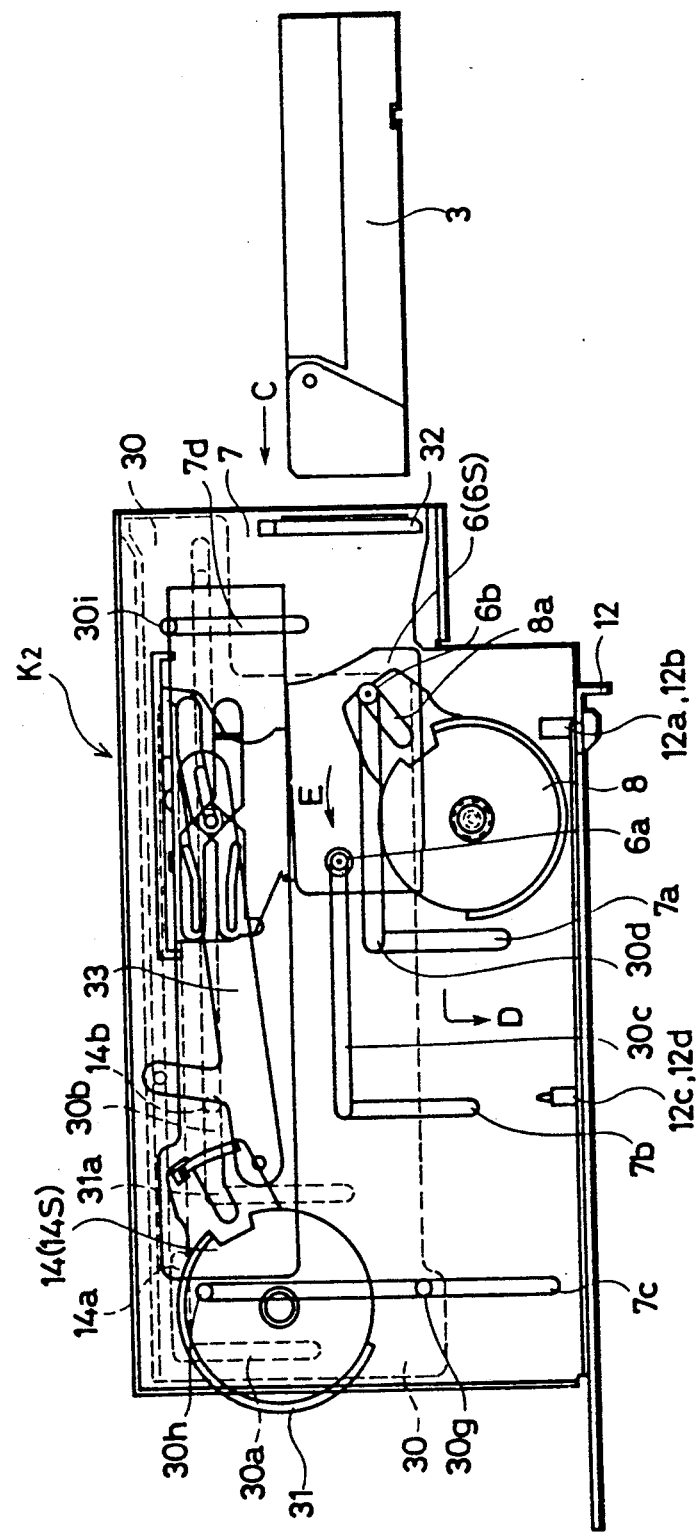
FIGS. 18, 19, 20, 21, 22, 23 and 24 are left side views of another embodiment of a cassette control unit of a magnetic recording and reproducing apparatus according to the present invention.

FIGS. 16 and 17 are left side views of an adapter portion used for inserting a small-sized cassette. Referring to those figures, a cassette loading mechanism according to this embodiment of the invention will be described. Generally, in the case of large-sized cassette loading, when a large-sized cassette 3 is inserted in the direction shown by the arrow C as shown in FIGS. 7 and 8, the cassette 3 is held by a slider 6 and loaded in the direction shown by the arrow D. The loading of the large sized cassette 3 is completed in the position (6P) shown in FIG. 8. The large-sized cassette 3 is ejected by operation opposite to this loading operation. In the case of small-sized cassette loading, when a small-sized cassette 1 is selected to be loaded, the adapter chassis 14 is moved from the initial position shown in FIG. 9 to the position shown in FIG. 8. Further, the adapter chassis 14 is discharged outside a cabinet (not shown) from an insertion opening for the large-sized cassette 3, as shown in FIG. 11. When the discharge of the adapter chassis 14 is detected, a housing 19 for holding the small-sized cassette 1 is released from the locked state in the adapter chassis 14 and it is raised. As a result, the housing 19 is ready for insertion of the small-sized cassette 1. As shown in FIG. 12, the small-sized cassette 1 is inserted in the direction shown by the arrow F and it is depressed, so that the housing 19 is locked in the adapter chassis 14. When the locked state of the housing 19 is confirmed, the magnetic tape 1a is drawn out to a position indicated by 1b as shown in FIG. 15. The magnetic tape 1a is drawn to this position in a manner in which a tape path of the small-sized cassette 1 coincides with a tape path of the large-sized cassette 3. When the drawing of the magnetic tape 1a is detected, the adapter chassis 14 is loaded in the position shown in FIG. 10. The adapter chassis 14 is further moved to the position shown in FIG. 13, whereby the loading of the small-sized cassette 1 is completed. Thus, the small-sized cassette 1 is in a state ready for recording and reproduction. The small-sized cassette 1 is ejected by the operation opposite to the loading operation.

Referring to FIG. 14A, the guide plate 7 has two L-shaped grooves 7a, 7b and two straight grooves 7c, 7d. A rotation shaft 7e of a drive gear 8 is provided on the guide plate 7. Referring to FIG. 14B, a slide plate 30 has two L-shaped grooves 30a, 30b, two straight grooves 30c, 30d and an L-shaped groove 30e projected from the surface of the slide plate 30. The slide plate 30 further includes a support shaft 30f of a loading gear 31, and three guide shafts 30g, 30h, 30i.

Referring to FIGS. 15 to 17, the adapter chassis 14 has, on each of its two sides, a first guide shaft 14a, a second guide shaft 14b, a third guide shaft 14c, and a support shaft 14f. The adapter chassis 14 is provided with a first housing arm 17 rotatable around the support shaft 14f. One end of the first housing arm 17 is attached slidably to an elongate hole 19a of the housing 19. A second housing arm 18 is provided rotatably around a support shaft 19b of the housing 19. An end of the second housing arm 18 is attached slidably to an elongate hole 14e of the adapter chassis 14. The first and second housing arms 17 and 18 are engaged with each other rotatably around a housing support shaft 17c near their central portions. An up spring 20 is attached to the first housing arm 17 and the adapter chassis 14 and it reacts to raise the housing 19. The adapter chassis 14 includes a lock mechanism (not shown) for the housing 19 and a mechanism enabling canceling of the lock by means of an adapter motor (not shown).

Figure 1:
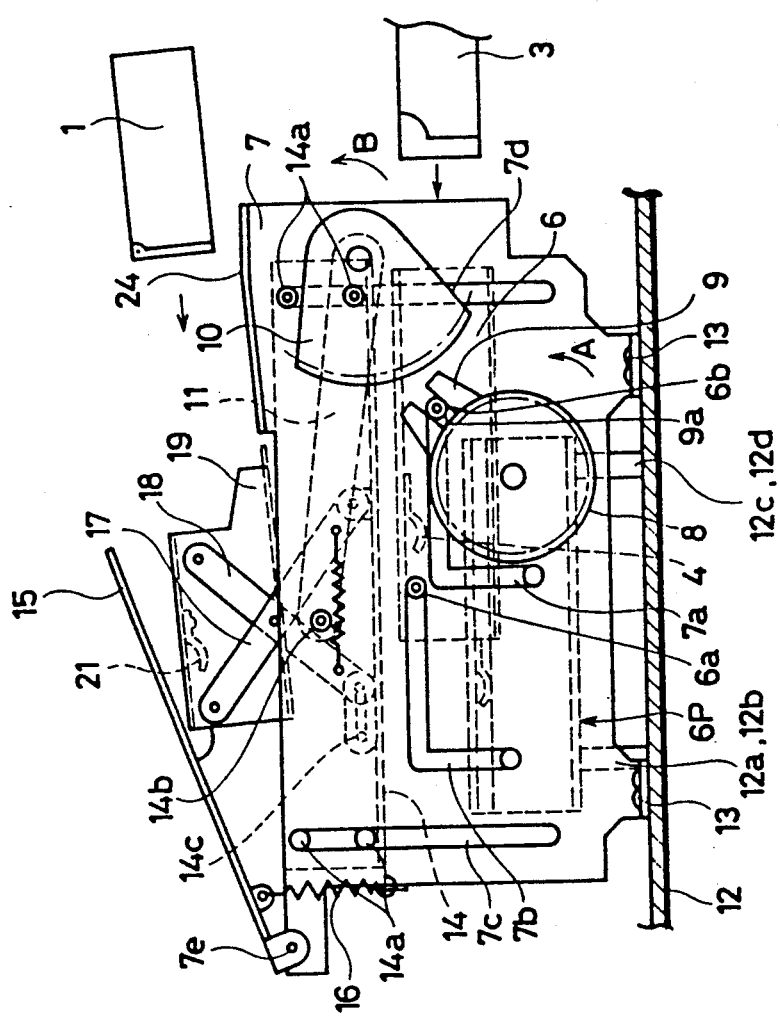
FIGS. 1 and 2 left side views of a cassette control unit of a magnetic recording and reproducing apparatus of the background art.
Figure 2:
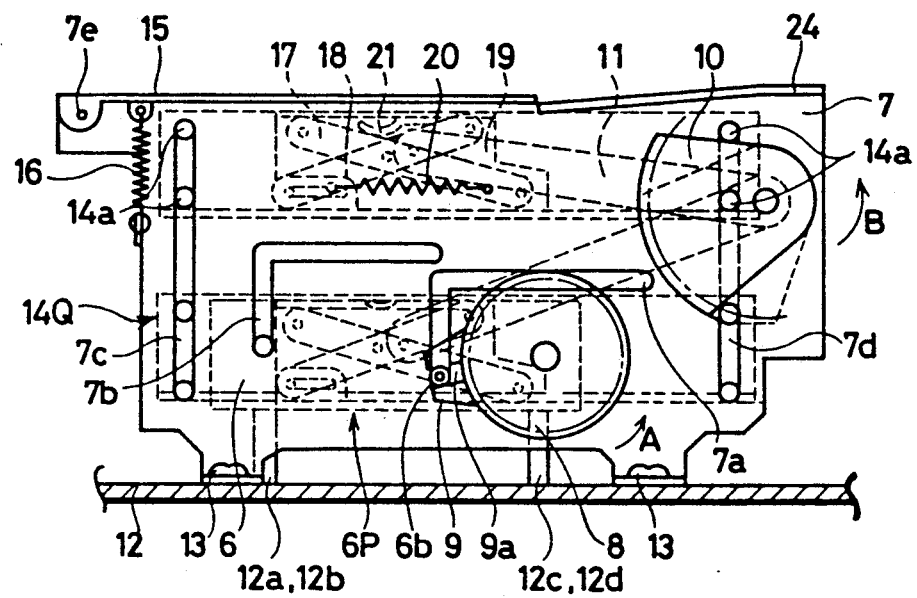
Figure 3:
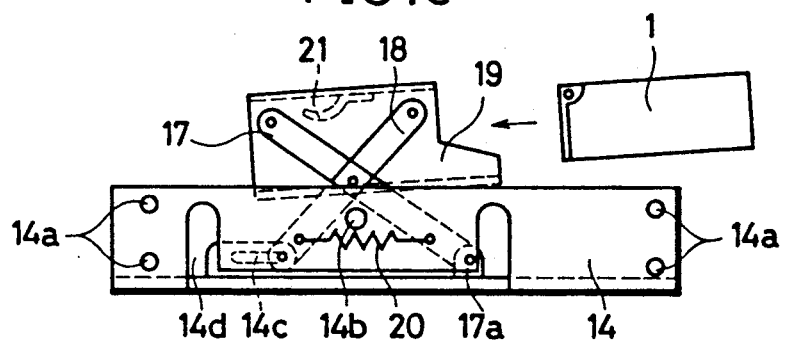
FIG. 3 is a left side view of an adapter portion used for inserting a small-sized cassette in the cassette control unit of the background art.
Figure 4:
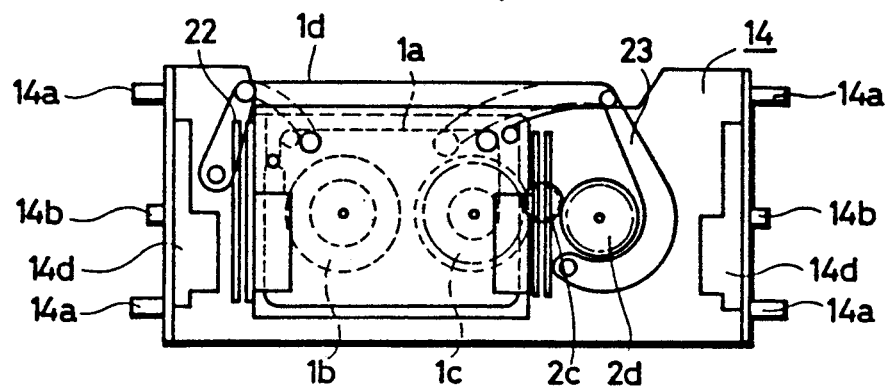
FIG. 4 is a plan view of the adapter portion used for inserting a small-sized cassette in the cassette control unit of the background art.
Figure 5:
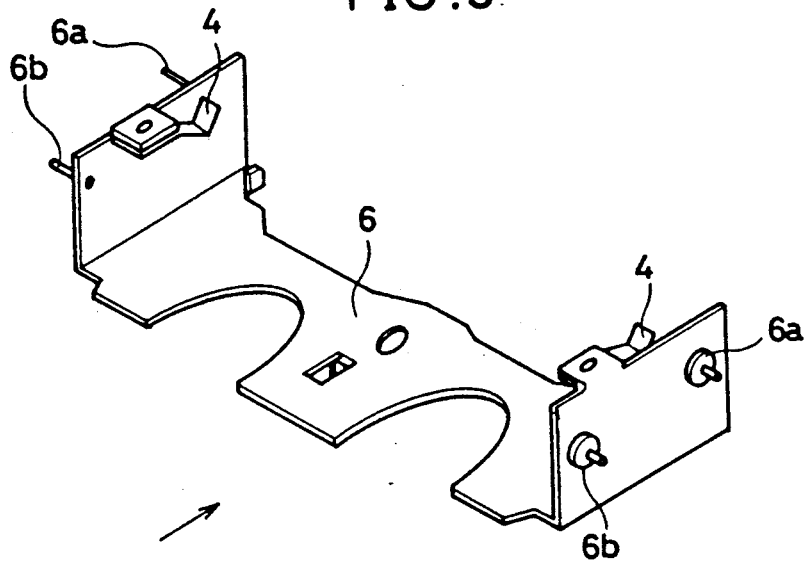
FIG. 5 is a perspective view of a slider.
Figure 6:
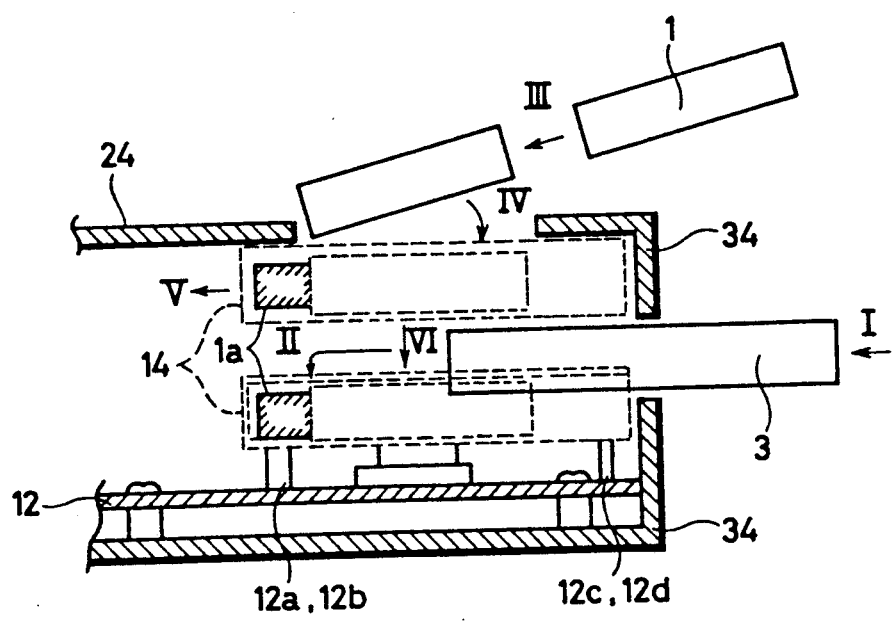
FIG. 6 is a schematic left side view roughly showing operation of the cassette control unit of the background art.

Referring to FIG. 7, the guide shafts 30g, 30h are inserted in the straight groove 7c of the guide plate 7 and the guide shaft 30i is inserted in the straight groove 7d, whereby the slide plate 30 is slidably attached to the guide plate 7. The guide plate 7 is attached to a main chassis 12 of the VTR by means of two fixation screws. The slider 6 has first and second guide shafts 6a and 6b in the same manner as in the background art shown in FIG. 5. The first guide shaft 6a is inserted in the groove 30c of the slide plate 30 and the L-shaped groove 7b of the guide plate 7. The second guide shaft 6b is inserted in the groove 30d of the slide plate 30 and the L-shaped groove 7a of the guide plate 7. The second guide shaft 6b is also inserted in the U-shaped groove 8a of the drive gear 8. The first and second guide shafts 14a and 14b are inserted in the L-shaped grooves 30a and 30b of the slide plate 30, respectively, whereby the adapter chassis 14 is slidably fixed to the slide plate 30. The second guide shaft 14b is inserted in the U-shaped groove 31a of the loading gear 31. The third guide shaft 14c of the adapter chassis 14 is fitted in the convex L-shaped groove 30e of the slide plate 30 only when the adapter chassis 14 is lowered along the slide plate 30.

Although not shown because of the same mechanism on the right and left sides, the right and left drive gears 8 and the right and left loading gears 31 have respective phase gears (not shown) so that those gears are rotated with the same phase. A cover 32 is provided rotatably on the guide plates 7. Thus, the cover 32 is opened by means of an open lever (not shown) operable in synchronization with the movement of the large-sized cassette 3 and the adapter chassis 14. Normally, the cover 32 is actuated in the direction to be closed by means of a cover spring (not shown).

Referring to FIGS. 7 and 8, in the case of loading the large-sized cassette 3 into the VTR, when the cassette 3 is manually inserted in the slider 6 in the direction shown by the arrow C, the cassette 3 is pressed fixedly against the slider 6 by means of the cassette spring 4 attached to the slider 6. At this time, a loading start switch (not shown) detects the insertion of the large-sized cassette 3 to drive a drive motor (not shown). As a result, the drive gears 8 rotate in the direction shown by the arrow E. By this rotation, the second guide shaft 6b is driven and guided along the two L-shaped grooves 7a, 7b of the guide plate 7, so that the slider 6 is horizontally moved. After that, the slider 6 is lowered vertically in the direction shown by the arrow D to the position shown by 6P. As a result, the large-sized cassette 3 is fixed on four positioning shafts 12a, 12b, 12c, 12d provided in the main chassis 12 of the VTR. Thus, the loading of the large-sized cassette 3 is completed. Since the first and second guide shafts 6a and 6b are inserted in the straight grooves 30c and 30d of the slide plate 30, respectively, when the slider 6 lowers vertically, the slide plate 30 also lowers and moves to the position shown by 30P. Since the adapter chassis 14 is fixed to the slide plate 30 in the position shown by 14S in FIG. 9, the adapter chassis 14 also lowers and moves to the position 14P shown in FIG. 8.

In the case of ejecting the large-sized cassette 3, the drive motor (not shown) is rotated reversely and the opposite operation to the above described loading operation is carried out, whereby the large-sized cassette 3 is taken out.

Figure 10:
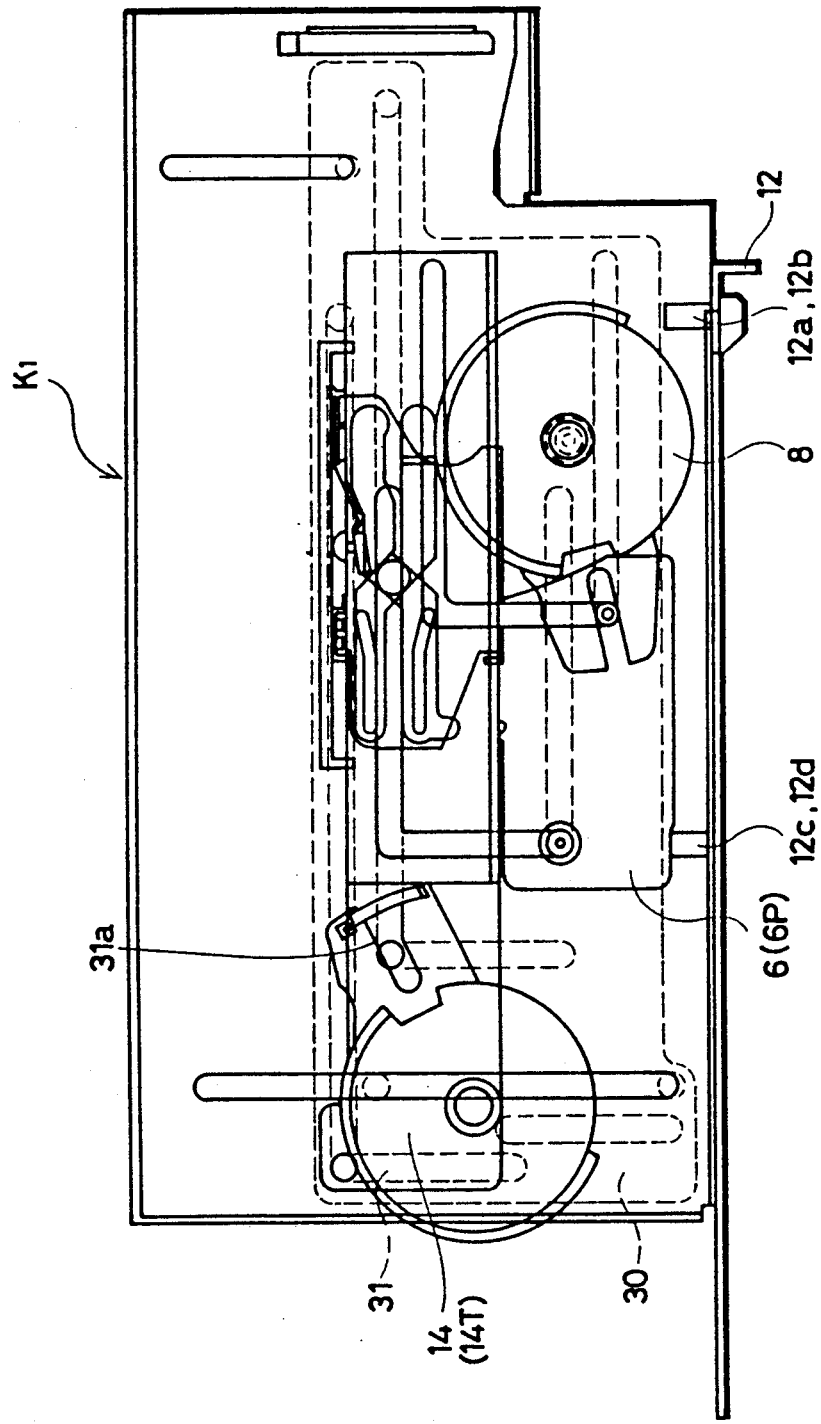
Figure 11:
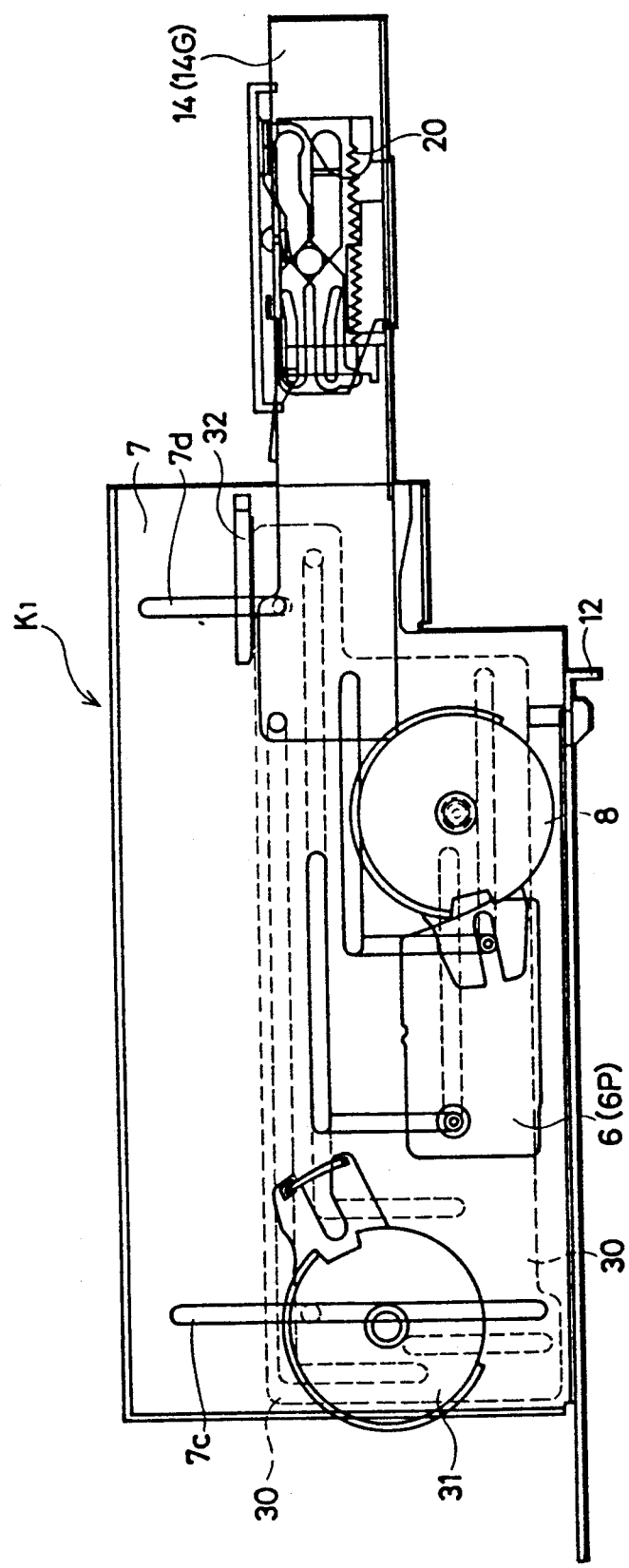
Figure 12:
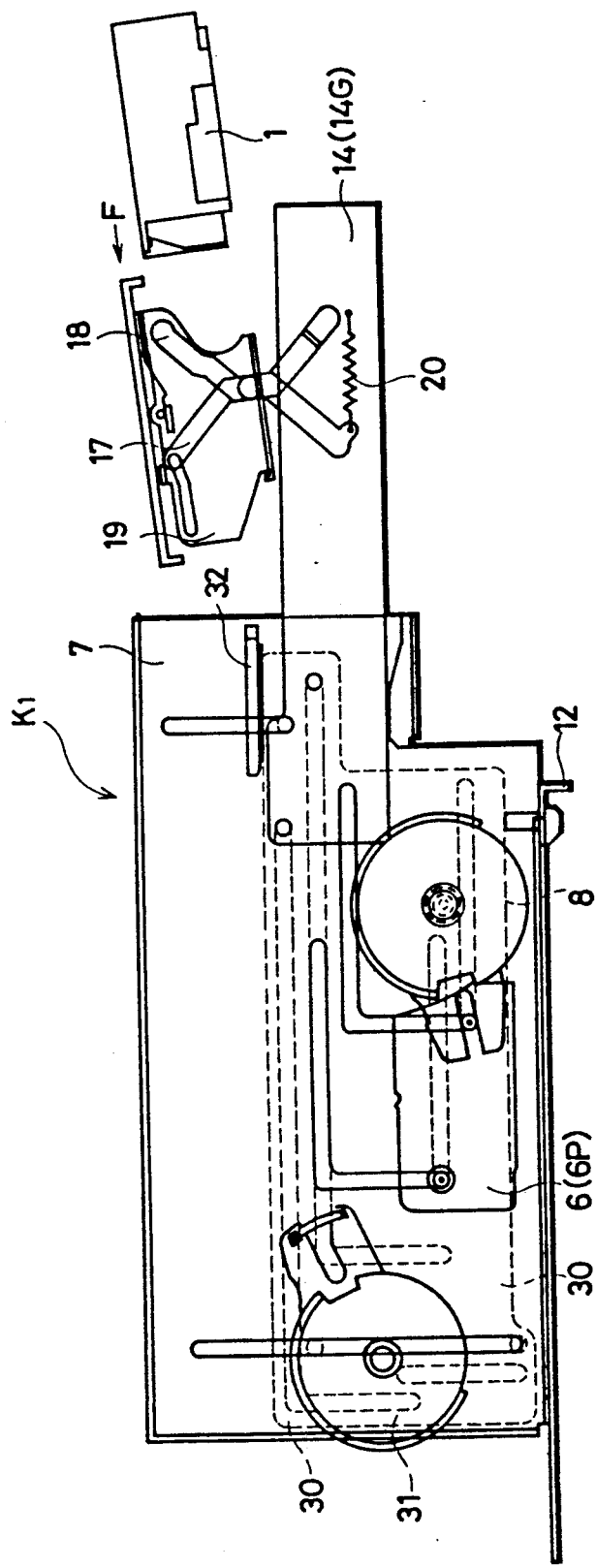
Figure 13:
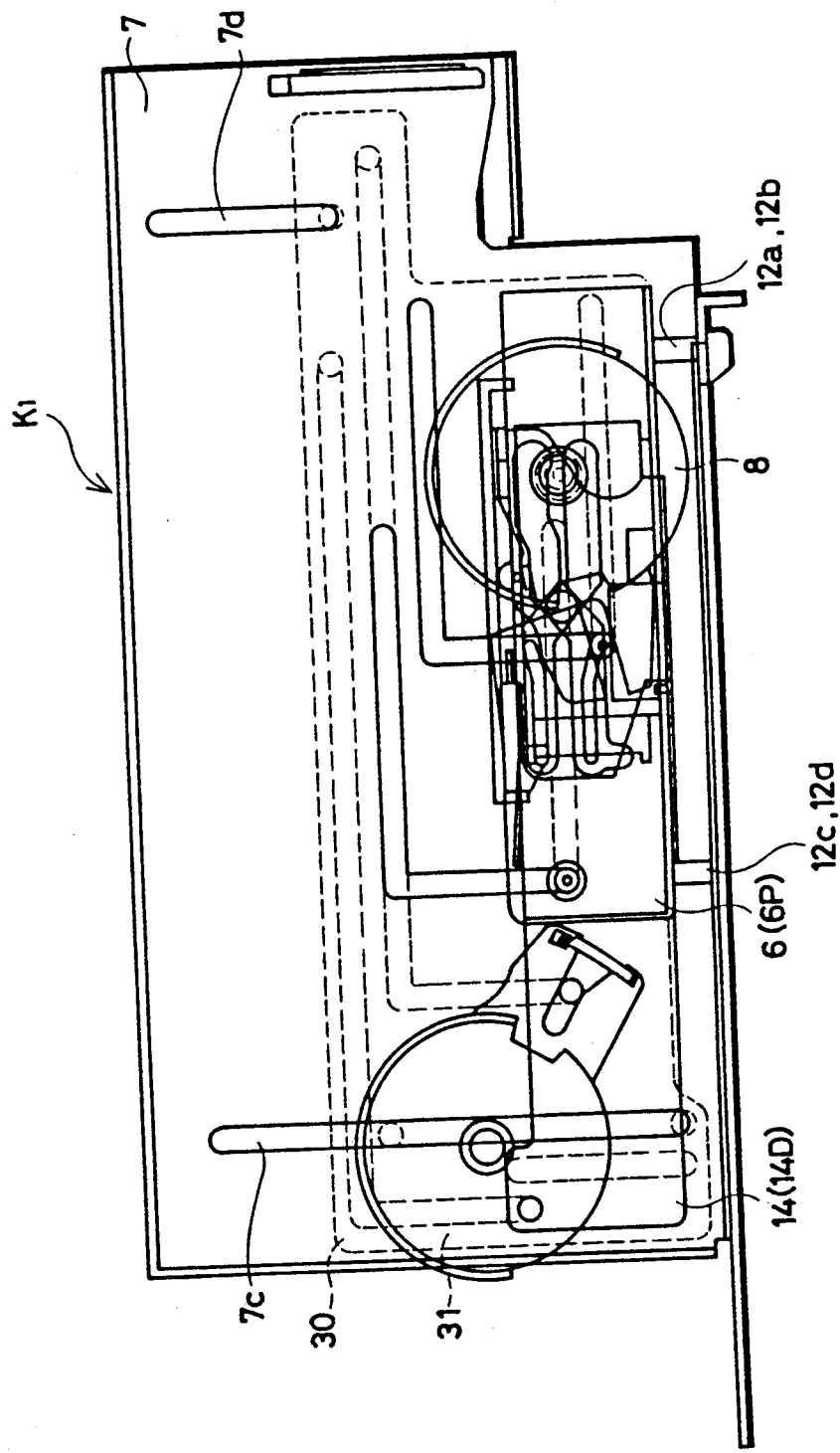

Referring to FIGS. 9 to 13, in the case of loading the small-sized cassette 1 into the VTR, when a selection switch (not shown) is set to loading of the small-sized cassette 1, the drive motor (not shown) is driven and the drive gears 8 are rotated in the direction shown by the arrow E. On this occasion, the slider 6 moves to the position 6P and the adapter chassis 14 moves to the position 14P (shown in FIG. 8) in the same manner as in the case of loading the large-sized cassette 3. After that, the adapter chassis 14 is guided from the position 14P by means of a slide motor (not shown) along the L-shaped grooves 30a, 30b of the slide plate 30 and moves to the position 14G. When the adapter chassis 14 in the position 14G is detected, the lock of the housing 19 is canceled by an adapter motor (not shown) and the housing 19 is raised by the action of the up spring 20. As a result, the housing 19 is ready for insertion of the small-sized cassette 1. When the small-cassette 1 is manually inserted into the housing 19 in the direction shown by the arrow F and the housing 19 is manually depressed to be locked in the adapter chassis 14, the small-sized cassette 1 is set by means of a lock switch (not shown). When the locked state of the housing 19 is detected, the adapter motor (not shown) is driven. As shown in FIG. 15, the magnetic tape 1a is drawn out to the prescribed position 1d by means of a housing motor (not shown) in the same manner as in the background art. At the completion of the drawing of the magnetic tape 1a, the slide motor (not shown) is driven, so that the adapter chassis 14 is moved to the position 14T (as shown in FIG. 10). When the adapter chassis 14 is moved to the position 14T, the loading motor (not shown) is driven to rotate the loading gears 31. In consequence, the adapter chassis 14 is guided along the L-shaped grooves 30a, 30b of the slide plate 30 and loaded on the four positioning shafts 12a, 12b, 12c, 12d provided in the main chassis 12 of the VTR. Thus, the loading of the small-sized cassette 1 is completed. The adapter chassis 14 has escape holes 14d for the slider 6 in the same manner as in the background art. Consequently, the adapter chassis 14 contacts the 4 positioning shafts 12a, 12b, 12c, 12d without any gap. As shown in FIG. 15, the magnetic tape 1a is wound and rewound in the same manner as in the background art.

The small-sized cassette 1 is ejected by the operation opposite to the above described loading operation.

Figure 25:
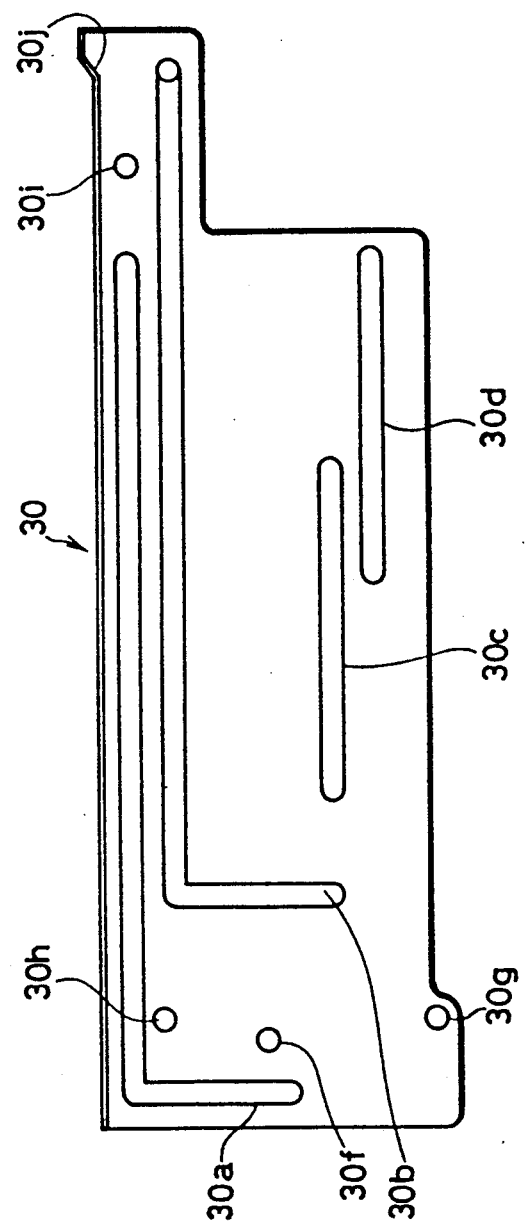
FIG. 25 is a left side view showing a slide plate used in the second embodiment of the cassette control unit according to the present invention.

FIGS. 18 to 28 are views showing another embodiment of a magnetic recording and reproducing apparatus according to the present invention. FIGS. 18 to 24 correspond to FIGS. 7 to 13. FIG. 25 corresponds to FIG. 14B and FIGS. 26 to 28 correspond to FIGS. 15 to FIG. 17. In the respective figures, the hidden portions are also represented by solid lines for the purpose of clearly illustrating the structure. Referring to those figures, a cassette control unit K2 as the cassette loading mechanism of this second embodiment of the invention will be described.

The operations of loading and ejecting the large-sized cassette are the same as in the above described embodiment shown in FIGS. 7 to 17 and therefore the description is not repeated.

Figure 19:
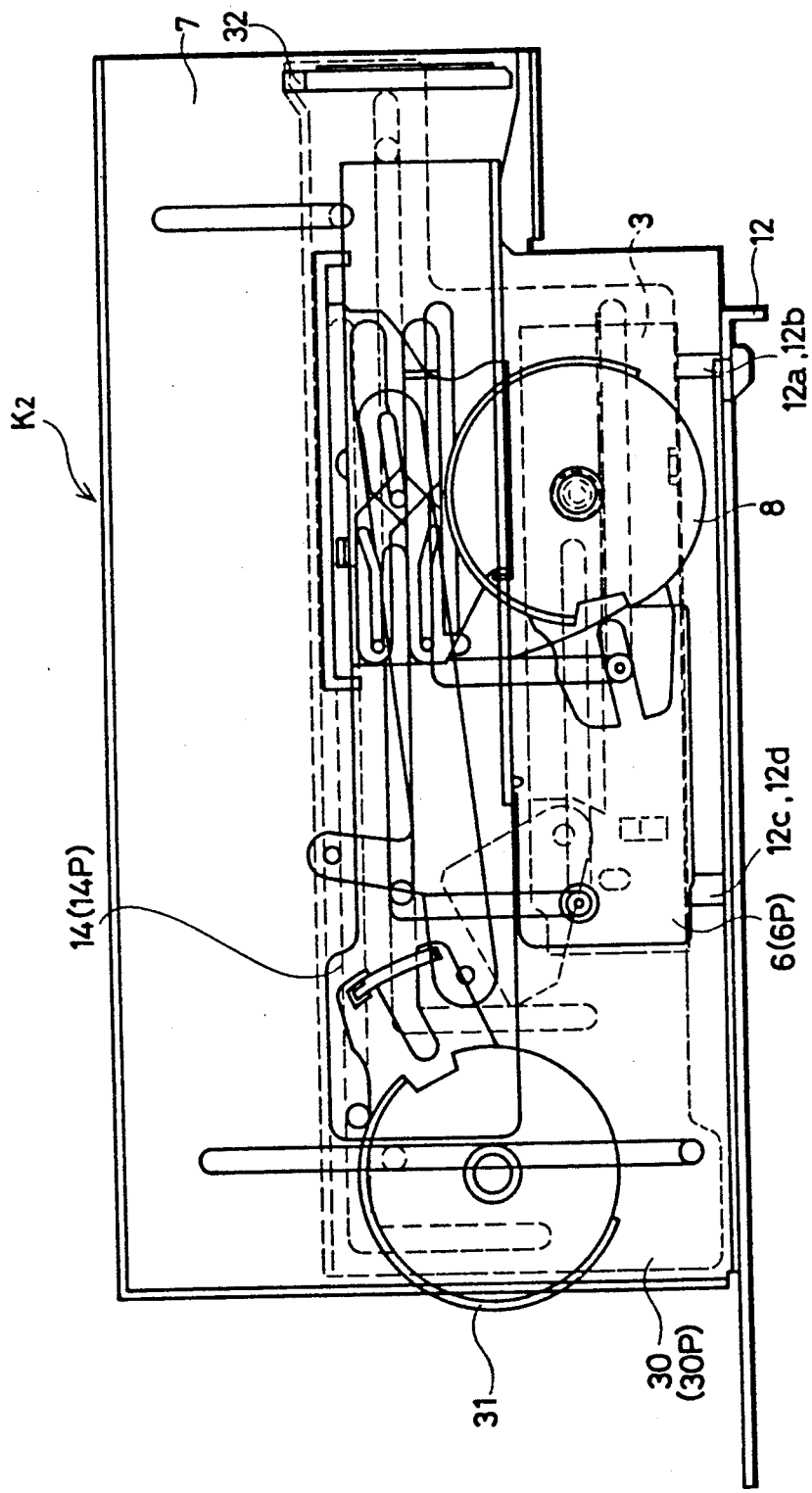
Figure 20:
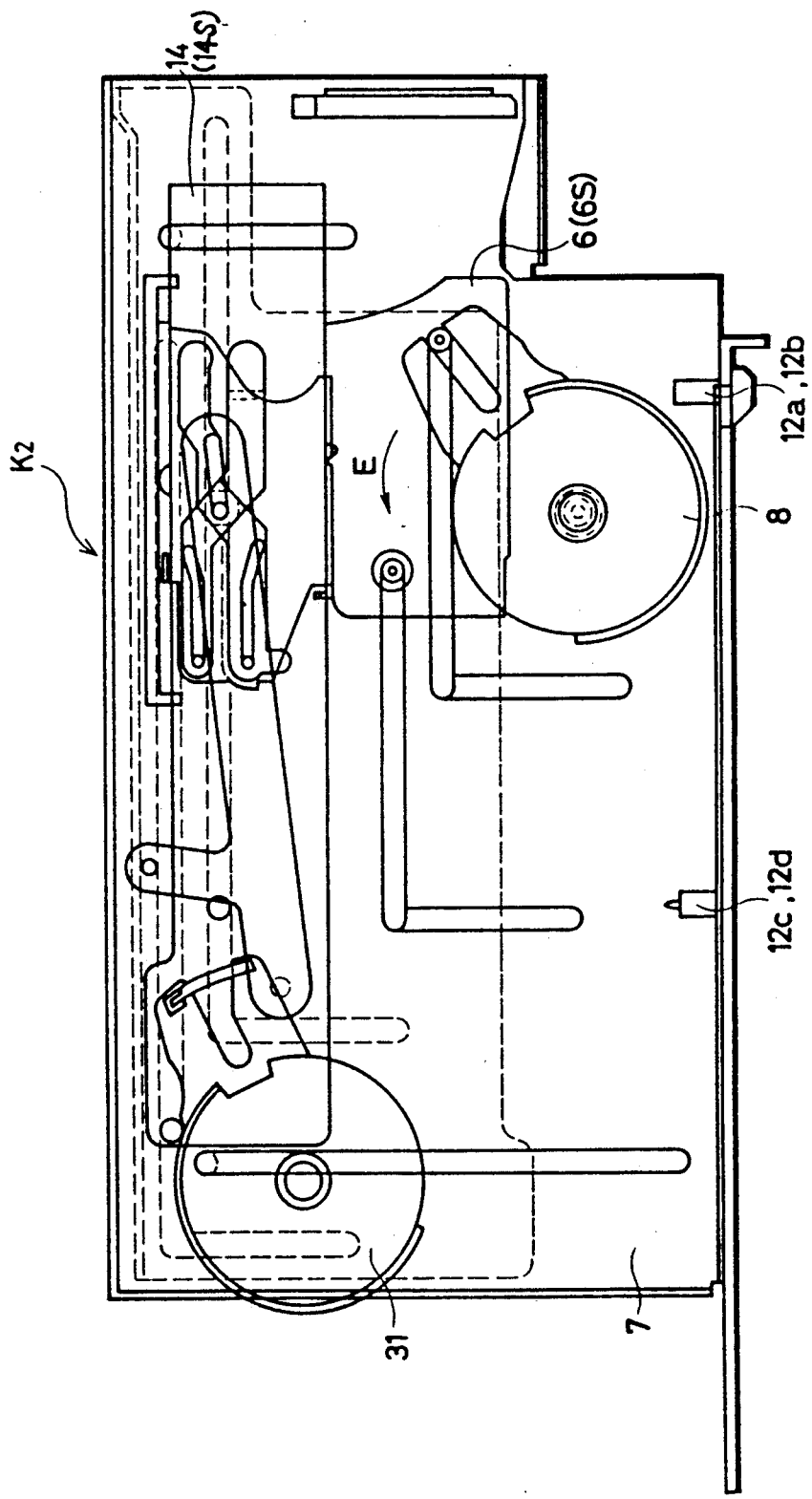
Figure 22:
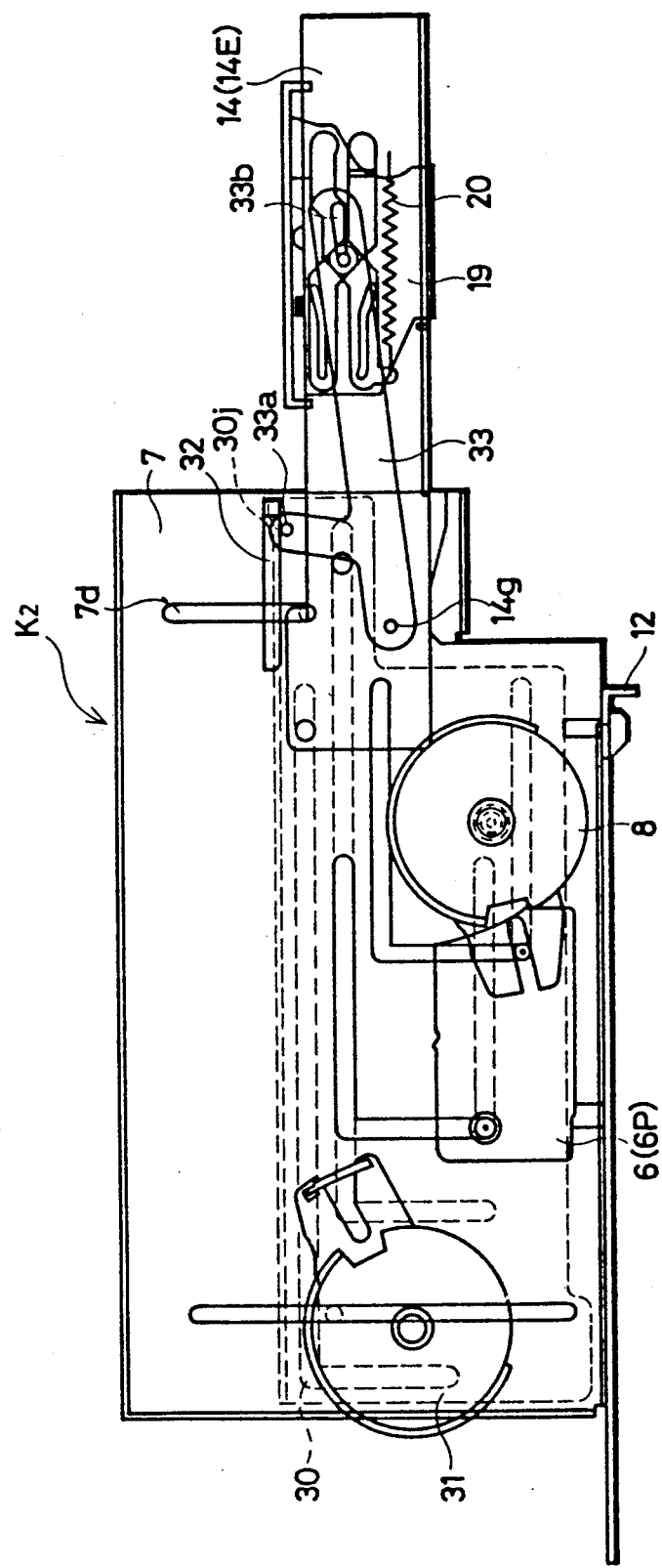
Figure 23:
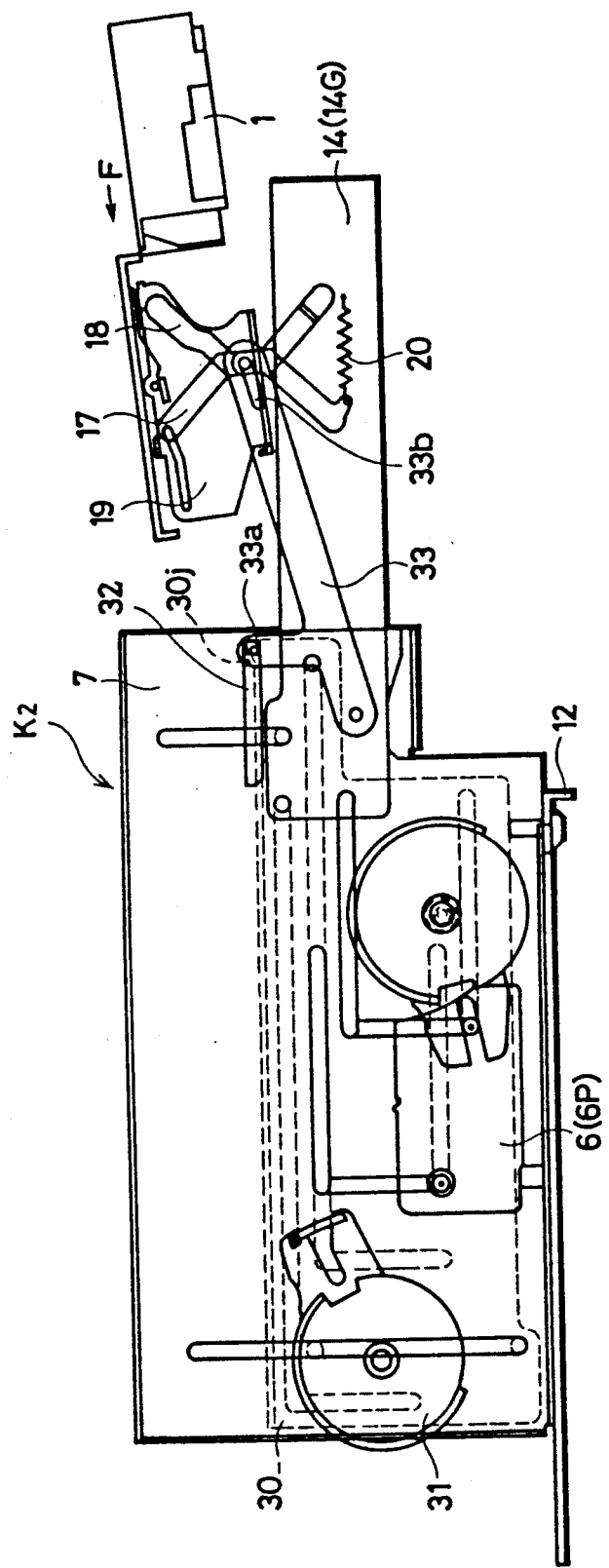
Figure 24:
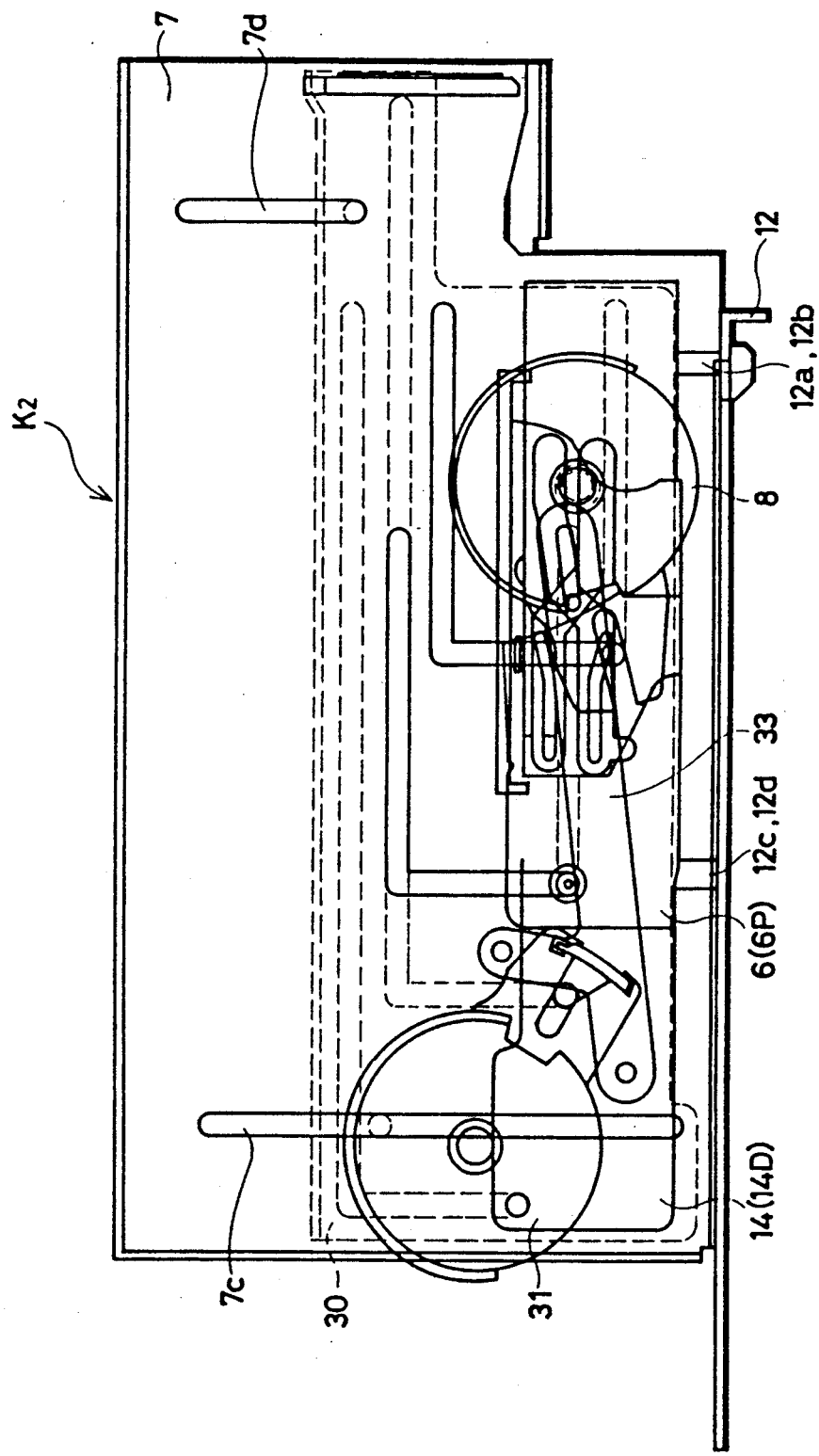
Figure 26:
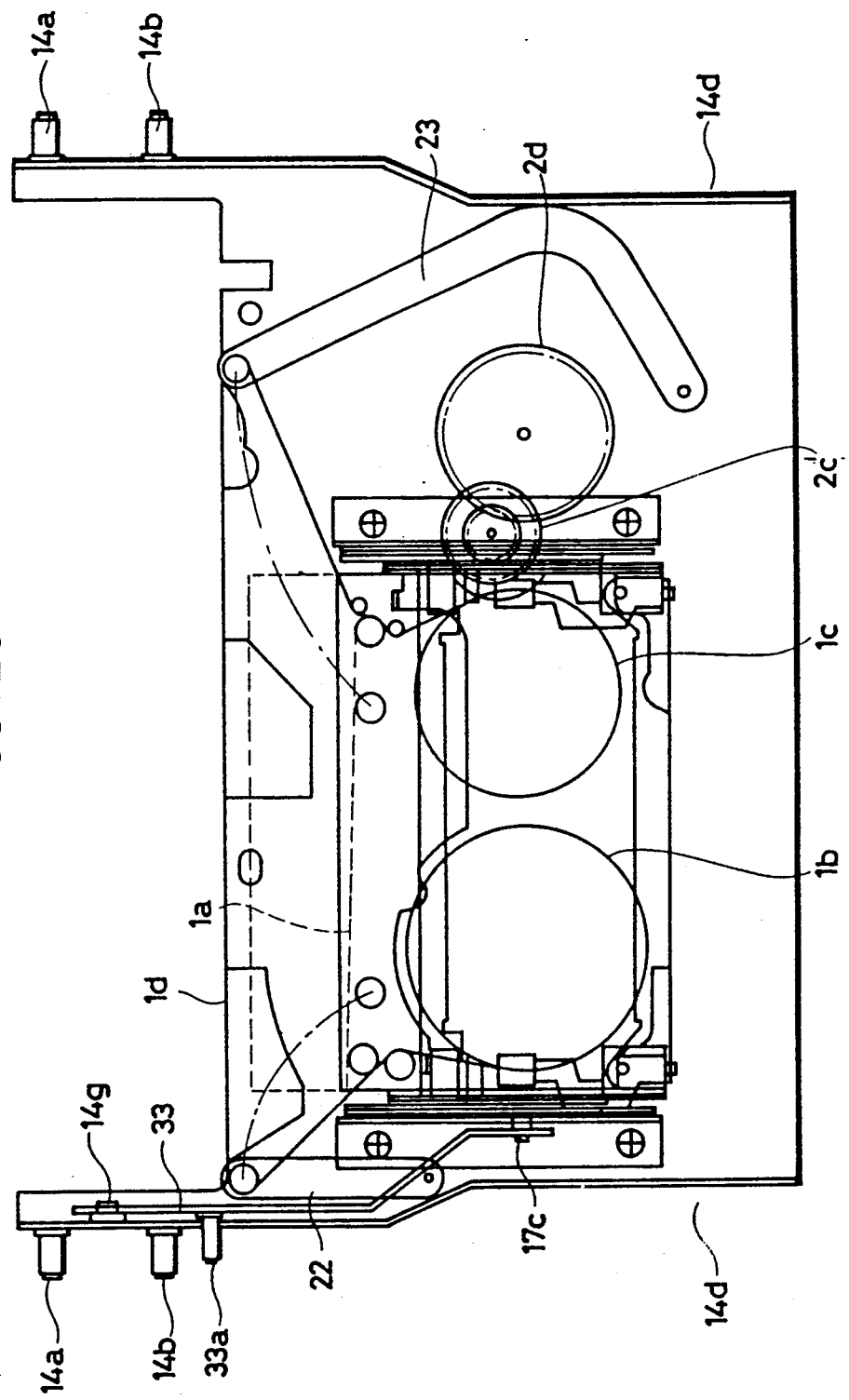
FIG. 26 is a plan view showing another example of an adapter chassis used for inserting a small-sized cassette.

In the case of small-sized cassette loading, when the loading of the small-sized cassette 1 is selected, the adapter chassis 14 is moved from the initial position shown in FIG. 20 to the position shown in FIG. 19. Further, the adapter chassis 14 is discharged outside a cabinet (not shown) from the insertion opening of the large-sized cassette 3 as shown in FIG. 22. Simultaneously with this discharge operation, the lock in the chassis 14 is canceled and the housing 19 for holding the small-sized cassette 1 is raised from the adapter chassis 14. As a result, the unit K2 is ready for insertion of the small-sized cassette 1. As shown in FIG. 23, the small-sized cassette 1 is inserted into the housing 19 in the direction shown by the arrow F and the housing 19 is depressed. When the depression is detected, the adapter chassis 14 starts to slide inside the cabinet and at the same time the housing 19 is further lowered and locked in the adapter chassis 14. When the locked state of the housing 19 is confirmed, the magnetic tape 1a is drawn out to the position shown by 1d as shown in FIG. 26. The subsequent operation is the same as in the above described first embodiment.

In this second embodiment, the guide plate on each side is the same as shown in FIG. 14A. Referring to FIG. 25, the slide plate 30 on each side is not provided with a convex L-shaped groove 30e, as is different from the slide plate 30 shown in FIG. 14. A slide plate cam 30j is provided over the whole length of the upper end of each slide plate 30.

Figure 27:
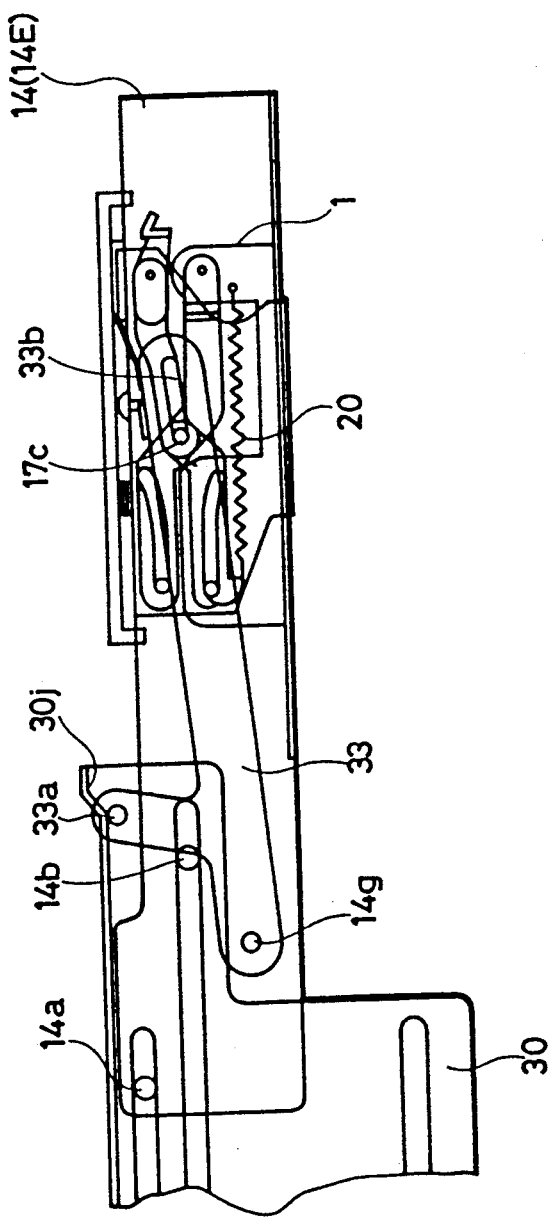
FIGS. 27 and 28 are left side views showing another example of the adapter portion used for inserting a small-sized cassette.
Figure 28:
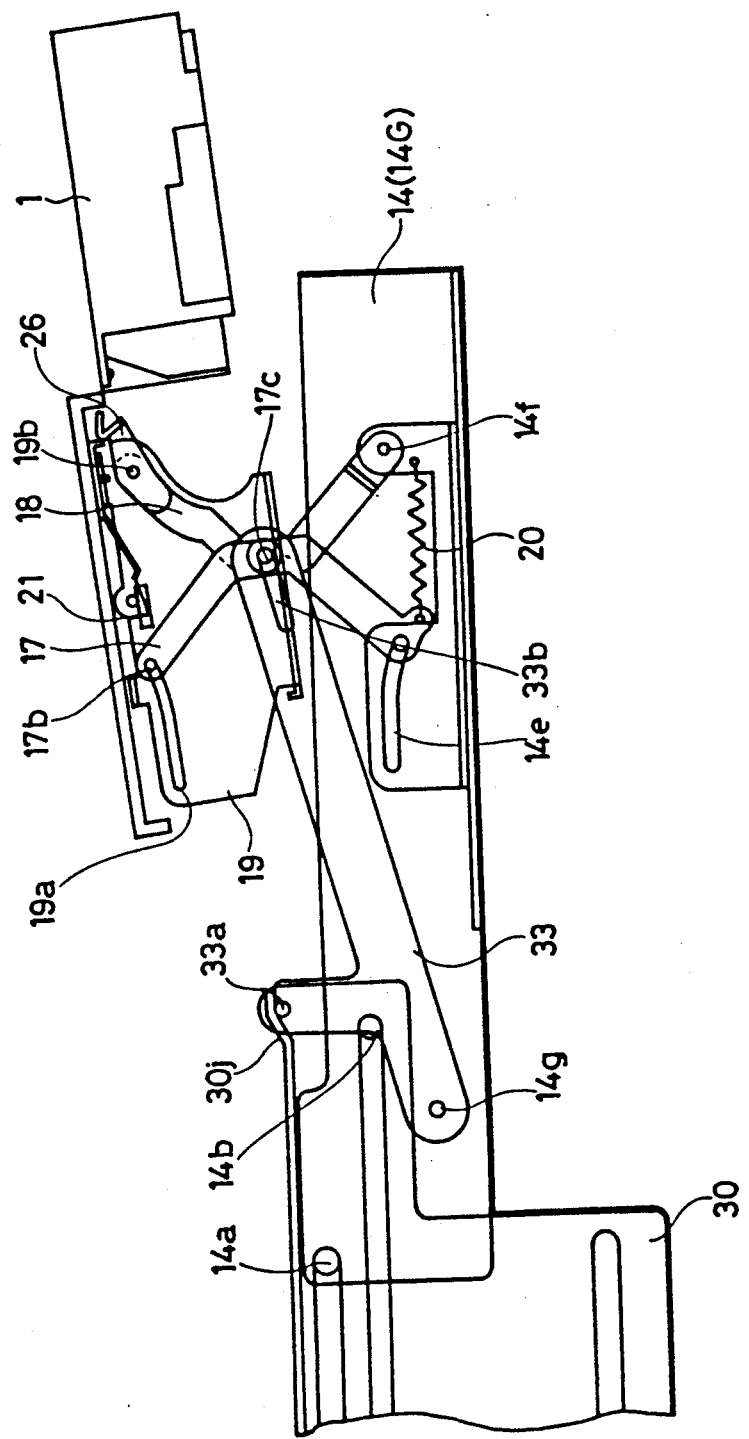

Referring to FIGS. 26 to 28, because the L-shaped groove 30e is not provided in the slide plate 30, the adapter chassis 14 is not provided with a third guide shaft 14c.

An up lever support shaft 14g is provided on an inner surface of the adapter chassis 14 and an end of the up lever 33 is attached rotatably to the shaft 14g. The other end of the up lever 33 is attached slidably to the housing support shaft 17c in an elongate hole 33b provided longitudinally near the other end. A cam follower 33a attached to the up lever 33 slides along the cam surface of the slide plate cam 30j. The cam follower 33a is in a positional relation shown in FIG. 27 until the adapter chassis 14 reaches the position 14E, and it serves to put the housing 19 in the adapter chassis 14 in opposition to the actuating force of the up spring 20 and to maintain the locked state set by a lock mechanism (not shown). The cam follower 33a moves upward and downward along the cam surface near the right end of the slide plate cam 30j. As a result, the up lever 33 rotates counterclockwise around the up lever support shaft 14g by the actuating force of the up spring 20 as the adapter chassis 14 moves from the position 14E to the position 14G, whereby the locked state is canceled and the housing 19 is raised.

Figure 21:
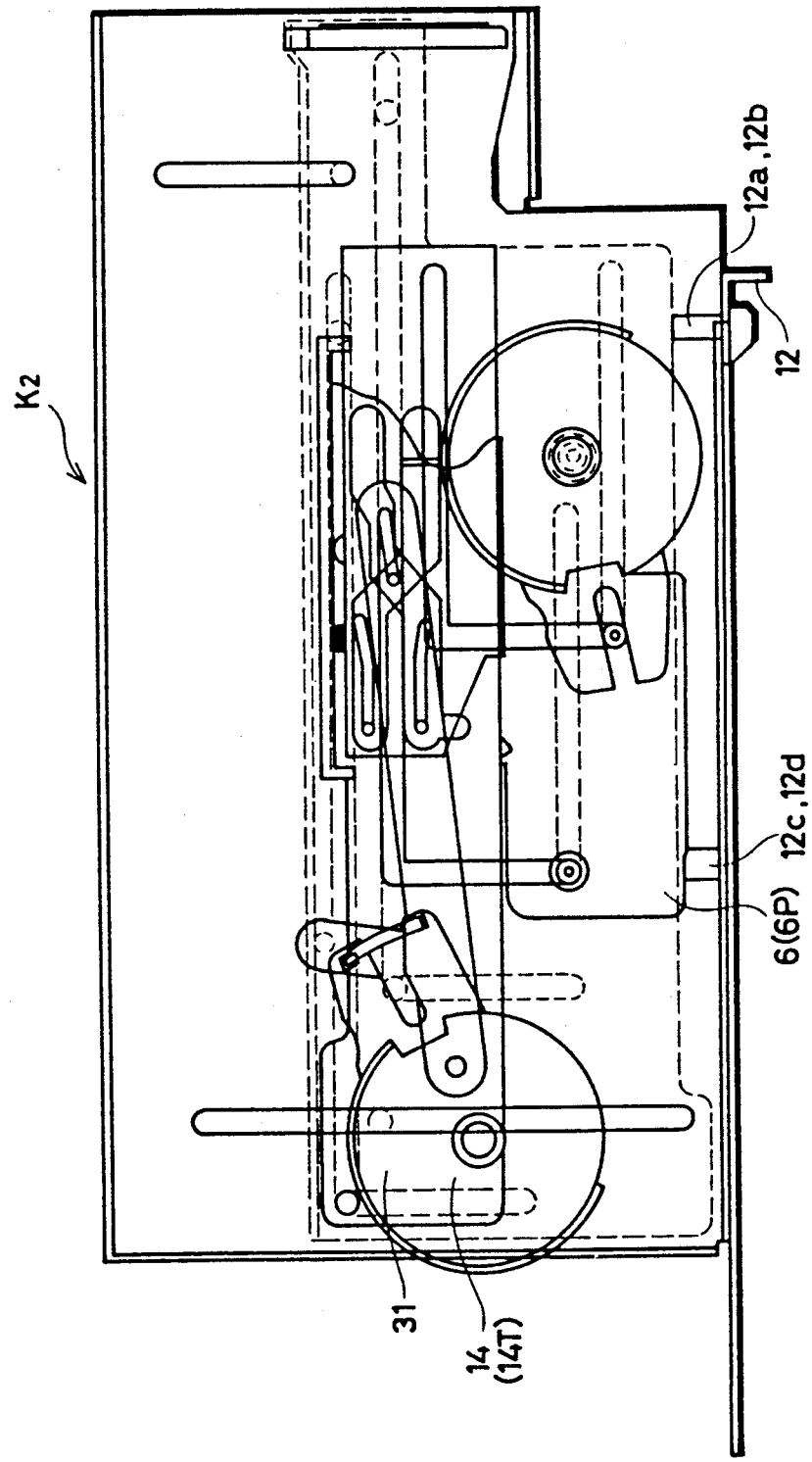

Referring to FIGS. 20 to 24, in the case of loading the small-sized cassette 1 into the VTR, when the selection switch (not shown) selects the loading of the small-sized cassette 1, the drive motor (not shown) is driven to rotate the drive gears 8 in the direction shown by the arrow E. At this time, the slider 6 moves to the position 6P and the adapter chassis 14 moves to the position 14P (as shown in FIG. 19) in the same manner as in the case of loading the large-sized cassette 3. After that, the adapter chassis 14 is guided from the position 14P along the L-shaped grooves 30a, 30b of the slide plate 30 by means of the slide motor (not shown) and it is moved to the position 14E. At the time when the adapter chassis 14 reaches the position 14E, the housing 19 is contained and maintained locked in the adapter chassis 14. However, as the adapter chassis 14 moves from the position 14E to the position 14G (as shown in FIG. 23), the up lever 33 becomes rotatable counterclockwise around the up lever support shaft 14g. As a result, the locked state is cancelled by the actuating force of the up spring 20 and the housing 19 is raised. Thus, the unit is ready for insertion of the small-sized cassette 1. When the small-sized cassette 1 is manually inserted into the housing 19 in the direction shown by the arrow F and the housing 19 is slightly depressed, the switch (not shown)

detects the depression to drive the slide motor (not shown), whereby the adapter chassis 14 starts to be contained in the cabinet. According to this movement, the cam follower 33a lowers along the slide plate cam 30j, thereby applying a downward force to the housing support shaft 17c through the elongate hole 33b. Thus, the housing 19 also lowers in opposition to the actuating force of the up spring 20. After the housing 19 reaches the position 14E shown in FIG. 22, the housing 19 is contained and locked in the adapter chassis 14. When the locked state of the housing 19 is detected and the adapter chassis 14 reaches the position 14P shown in FIG. 19, the magnetic tape 1a is drawn out to the prescribed position 1d as shown in FIG. 26 by means of the housing motor (not shown) in the same manner as in the background art. At the completion of the drawing of the magnetic tape 1a, the slide motor (not shown) is driven and the adapter chassis 14 is moved to the position 14T (as shown in FIG. 21). After the adapter chassis 14 reaches the position 14T, the loading motor (not shown) is driven to rotate the loading gears 31. As a result, the adapter chassis 14 is guided along the L-shaped grooves 30a, 30b of the slide plate 30 and loaded on the four positioning shafts 12a, 12b, 12c, 12d provided in the main chassis 12 of the VTR. Thus, the loading of the small-sized cassette 1 is completed. The adapter chassis 14 has escape portions 14d for the slider 6. Consequently, the adapter chassis 14 contacts 12a, 12b, 12c, 12d without any gap. As shown in FIG. 26, winding and rewinding of the magnetic tape 1a are carried out in the same manner as in the background art.

The small-sized cassette 1 is ejected by the operation opposite to the above described operation.

THus, according to an aspect of the present invention, cassettes of different sizes can be selectively loaded through the same insertion opening and thus it is possible to provide a cassette loading mechanism of a magnetic recording and reproducing apparatus having simple operability with less limitation on the design.

According to another aspect of the invention, the inlet opening and closing means for the small-sized cassette is automatically operated simultaneously with the movement of the small-sized cassette support means and accordingly, the operability in the case of loading the small-sized cassette is further improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cassette loading mechanism of a magnetic recording and reproducing apparatus, for selectively loading a large-sized cassette and a small-sized cassette containing a magnetic tape as a magnetic recording medium into a position for recording and reproduction, comprising:

a case (K1) provided with a large-sized cassette insertion opening having a form corresponding to a large-sized cassette (3) to be inserted, large-sized cassette support means (6) for supporting, in a prescribed position, the large-sized cassette inserted into said case from said large-sized cassette insertion opening, large-sized cassette moving means (7, 8) for moving said large-sized cassette support means between an inlet position (6S) for inserting and taking out the large-sized cassette into and from said case through said large-sized cassette insertion opening and an operation position (6P) for magnetic recording and reproduction of the large-sized cassette, small-sized cassette support means (14, 19) disposed in said case, for setting a small-sized cassette (1) received outside said case through said large-sized cassette insertion opening and supporting said small-sized cassette in a prescribed position, and small-sized cassette moving means (30, 31) for moving said small-sized cassette support means between a retreat position (14S) where the small-sized cassette is moved away from a movement course of the large-sized cassette when the large-sized cassette is inserted and a setting position (14G) where the small-sized cassette is set and taken out outside said case through said large-sized cassette insertion opening, and between said setting position and said operation position (14D) for magnetic recording and reproduction of the small-sized cassette, said small-sized cassette support means being able to be set in said large-sized cassette support means in said operation position.

2. A cassette loading mechanism in accordance with claim 1, wherein said large-sized cassette moving means comprises large-sized cassette guide means (7) for guiding movement of said large-sized cassette support means between said inlet position and said operation position, and large-sized cassette drive means (8) for moving said large-sized cassette support means along said large-sized cassette guide means.

3. A cassette loading mechanism in accordance with claim 2, wherein said large sized cassette guide means includes a plate, a groove provided in the plate, and a shaft sliding along the groove.

4. A cassette loading mechanism in accordance with claim 3, wherein said large-sized cassette drive means includes rotation means for sliding said shaft along said groove.

5. A cassette loading mechanism in accordance with claim 1, wherein said small-sized cassette support means comprises small-sized cassette receiving means (19) for receiving the small-sized cassette outside said case through said large-sized cassette insertion opening, and small-sized cassette setting means (14) for setting in a prescribed position the small-sized cassette received by said small-sized cassette receiving means.

6. A cassette loading mechanism in accordance with claim 5, wherein said small-sized cassette guide means includes a plate, a groove provided in the plate, and a shaft sliding along the groove.

7. A cassette loading mechanism in accordance with claim 6, wherein said small-sized cassette drive means includes rotation means for sliding said shaft along said groove.

8. A cassette loading mechanism in accordance with claim 1, wherein said small-sized cassette moving means comprises small-cassette guide means (30) for guiding movement of said small-sized cassette support means between said retreat position and said setting position and between said setting position and said operation position, and small-sized cassette drive means (31) for moving said small-sized cassette support means along said small-sized cassette guide means.

9. A cassette loading mechanism in accordance with claim 8, wherein said small-sized cassette guide means comprises first small-sized cassette guide means (30c, 30d, 30g, 30h, 30i) for guiding movement of said small-sized cassette support means between said retreat position and an intermediate position (14P), second small-sized cassette guide means (14l, 14b, 30a, 30b) for guiding movement of said small-sized cassette support means between said intermediate position and said operation position.

10. A cassette loading mechanism in accordance with claim 9, wherein said large-sized cassette guide means (6a, 6b, 7a, 7b, 7c, 7d) is also used as said first small-sized cassette guide means.

11. A cassette loading mechanism in accordance with claim 10, wherein said small-sized cassette support means is moved by said large-sized cassette drive means between said retreat position and said intermediate position along said large-sized cassette guide means.

12. A cassette loading mechanism of a magnetic recording and reproducing apparatus, for selectively loading a large-sized cassette and a small-sized cassette containing a magnetic tape as a magnetic recording medium into a position for recording and reproduction, comprising:

a case (K2) having a large-sized cassette insertion opening, small-sized cassette support means (14, 19) disposed in said case, for setting and supporting a small-sized cassette (3), entrance opening and closing means (17, 18, 33) provided in said small-sized cassette support means, for opening and closing a small-sized cassette entrance, guide means (30) for guiding movement of said small-sized cassette support means between a retreat position (14S) where the small-sized cassette (1) is moved away from a movement course of a large-sized cassette (3) when said large-sized cassette (3) is inserted and a setting position (14G) where the small-sized cassette entrance is projected outside said case through said large-sized cassette insertion opening to enable the small-sized cassette (1) to be set or taken out, and between said setting position and an operation position (14D) for magnetic recording and reproduction of the small-sized cassette (1), drive means (31) for moving said small-sized cassette support means along said guide means, actuating means (20) for actuating said entrance opening and closing means to be in an open state, lock means (30j, 33a) for locking said entrance opening and closing means in a closed state in opposition to actuating force of said actuating means, and lock cancel means for cancelling the locking of said lock means when said small-sized cassette support means is moved to said setting position.

* * * * *